United States Patent
Chen et al.

(10) Patent No.: US 12,361,960 B2
(45) Date of Patent: Jul. 15, 2025

(54) TRANSFORMING VOICE SIGNALS TO COMPENSATE FOR EFFECTS FROM A FACIAL COVERING

(71) Applicant: Cisco Technology, Inc., San Jose, CA (US)

(72) Inventors: Eric Y. Chen, Irvine, CA (US); Shamim S. Pirzada, San Jose, CA (US); Cullen Frishman Jennings, Calgary (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 297 days.

(21) Appl. No.: 17/728,334

(22) Filed: Apr. 25, 2022

(65) Prior Publication Data
US 2023/0343351 A1    Oct. 26, 2023

(51) Int. Cl.
*G10L 21/0364* (2013.01)
*G06F 18/2413* (2023.01)
(Continued)

(52) U.S. Cl.
CPC .......... *G10L 21/0364* (2013.01); *G06V 20/60* (2022.01); *G06V 40/10* (2022.01);
(Continued)

(58) Field of Classification Search
CPC ............... G10L 21/0364; G10L 15/063; G10L 15/1807; G10L 15/187; G10L 15/22;
(Continued)

(56) References Cited

U.S. PATENT DOCUMENTS

2012/0265534 A1* 10/2012 Coorman .............. G10L 13/033
704/265
2015/0199977 A1* 7/2015 Ungstrup ............. H04R 25/554
704/260
(Continued)

FOREIGN PATENT DOCUMENTS

IN     202131043611 A    10/2021
WO     2021022079 A1     2/2021

OTHER PUBLICATIONS

"Face Mask with Microphone and Speaker for Speech Enhancement," Technical Disclosure Commons, https://www.tdcommons.org/dpubs_series/3961, Published Jan. 12, 2021, 5 pages.
(Continued)

*Primary Examiner* — Richa Sonifrank
*Assistant Examiner* — Ian Scott McLean
(74) *Attorney, Agent, or Firm* — Edell, Shapiro & Finnan, LLC

(57) ABSTRACT

In one example embodiment, audio characteristics of audio signals are adjusted by a first machine learning model to reduce effects of a facial covering and produce adjusted audio signals. The audio signals correspond to resulting voice signals produced from the facial covering affecting original voice signals. Speech characteristics are predicted for the adjusted audio signals by a second machine learning model. Transformed audio signals corresponding to the original voice signals are produced based on the adjusted audio signals and predicted speech characteristics.

20 Claims, 15 Drawing Sheets

(51) Int. Cl.
*G06V 10/82* (2022.01)
*G06V 20/60* (2022.01)
*G06V 40/10* (2022.01)
*G06V 40/16* (2022.01)
*G10L 15/06* (2013.01)
*G10L 15/18* (2013.01)
*G10L 15/187* (2013.01)
*G10L 15/22* (2006.01)
*G10L 15/25* (2013.01)
*G10L 15/30* (2013.01)
*G10L 21/02* (2013.01)
*G10L 21/034* (2013.01)
*G10L 25/30* (2013.01)

(52) U.S. Cl.
CPC ........ *G10L 15/063* (2013.01); *G10L 15/1807* (2013.01); *G10L 15/187* (2013.01); *G10L 15/22* (2013.01); *G10L 15/25* (2013.01); *G10L 15/30* (2013.01); *G10L 21/034* (2013.01); *G10L 2021/03646* (2013.01)

(58) Field of Classification Search
CPC ....... G10L 15/25; G10L 15/30; G10L 21/034; G10L 2021/03646; G10L 21/02; G10L 25/30; G06V 20/60; G06V 40/10; G06V 10/82; G06V 40/169; G06V 40/172; G06F 18/24143
See application file for complete search history.

(56) References Cited

U.S. PATENT DOCUMENTS

| 2020/0294495 A1 | 9/2020 | Li et al. |
| 2021/0390949 A1 | 12/2021 | Wang et al. |
| 2022/0093078 A1* | 3/2022 | Diriye .................. G10L 13/033 |
| 2022/0343934 A1* | 10/2022 | Lynch .................. G06V 40/166 |
| 2023/0169961 A1* | 6/2023 | Morrison ................ G10L 15/04 704/232 |

OTHER PUBLICATIONS

Nicolae-Cătălin Ristea, et al., "Are you wearing a mask? Improving mask detection from speech using augmentation by cycle-consistent GANs," Research Gate, Oct. 2020, 6 pages.
George Ho, "Autoregressive Models in Deep Learning—A Brief Survey," https://www.georgeho.org/deep-autoregressive-models/, Mar. 9, 2019, 7 pages.
Conor O'Sullivan, "Deep Neural Network Language Identification," Towards Data Science, https://towardsdatascience.com/deep-neural-network-language-identification-ae1c158f6a7d, Aug. 25, 2020, 15 pages.
Joseph C. Toscano, et al., "Effects of face masks on speech recognition in multi-talker babble noise," Plos One, https://doi.org/10.1371/journal.pone.0246842, Feb. 24, 2021, 12 pages.
Abhijit Roy, "Introduction to Autoencoders," Towards Data Science, https://towardsdatascience.com/introduction-to-autoencoders-7a47cf4ef14b, Dec. 12, 2020, 30 pages.
Florian Stimberg, et al., "WaveNetEQ—Packet Loss Concealment with WaveRNN," IEEE Xplore, Nov. 2020, 5 pages.

* cited by examiner

TRANSFORMING VOICE SIGNALS TO COMPENSATE FOR EFFECTS FROM A FACIAL COVERING

TECHNICAL FIELD

The present disclosure relates to voice and speech processing.

BACKGROUND

Users are increasingly wearing facial masks during video conference calls due to mandates that are enforced at locations of the users for those calls, such as workplaces, public establishments, etc. The use of facial masks is not limited to mandates caused by widespread health conditions since healthcare professionals frequently wear facial masks and routinely conduct video conferences with remote patients (even in the absence of the widespread health conditions).

However, facial masks degrade voice quality and impact speech recognition. In particular, an acoustic analysis indicated that facial masks tend to attenuate higher frequencies, thereby resulting in voice sounding muffled. Further, reusable cloth masks generally muffle voice greater than disposable surgical masks. In addition, some populations have a higher likelihood of voice being distorted due to a frequency spread of their speech. Another analysis shows the impact of facial masks on speech recognition. Specifically, the other analysis indicated that accuracy of speech recognition dropped by six percent (6%) in a quiet environment and dropped up to eighteen percent (18%) in an environment with background noises, such as a public establishment. Since video conference participants wearing facial masks are more likely to be at a public establishment (which has background noises), speech recognition for the video conference is likely to be adversely affected.

This impact may be illustrated in another manner based on English consonants. For example, voiceless consonants (e.g., "p", "t", "k", "f", "s", etc.) can easily become inaudible by reduced air flow over a vocal tract caused by pressure in a facial mask. Similarly, voiced consonants (e.g., "b", "d", "g", "v", etc.) can be easily mistaken as voiceless consonants when muffled by a facial mask. Subtle impact on these types of consonants can have a significant impact on speech recognition of minimal pairs (e.g., pairs of words that differ in only one phoneme, such as pin/bin, seal/zeal, hat/had, mouth/mouse, etc.).

DESCRIPTION OF EXAMPLE EMBODIMENTS

Overview

In one example embodiment, audio characteristics of audio signals are adjusted by a first machine learning model to reduce effects of a facial covering and produce adjusted audio signals. The audio signals correspond to resulting voice signals produced from the facial covering affecting original voice signals. Speech characteristics are predicted for the adjusted audio signals by a second machine learning model. Transformed audio signals corresponding to the original voice signals are produced based on the adjusted audio signals and the predicted speech characteristics.

Example Embodiments

An example embodiment transforms voice signals in real-time from users employing a facial mask during an online meeting or conference to compensate for effects of the facial mask and enable the voice signals to sound clear and resemble original voice signals (e.g., unaffected by a facial mask, etc.). This significantly improves voice quality and speech recognition for the meeting. The example embodiment addresses (or corrects) audio characteristics (e.g., gains across frequencies, etc.) and speech characteristics (e.g., speech consistency pertaining to phonemes and prosody, etc.) of voice signals in order to compensate for the effects of the facial mask and produce significantly enhanced results.

Although a simple equalizer (before noise reduction) may be used to compensate for certain facial masks, the simple equalizer is limited by its static nature. Thus, each type of facial mask requires a different set of optimal equalizer settings since the impact on voice signals varies with the type of facial mask employed. However, present embodiments automatically adjust in response to input voice signals and produce the clearest possible voice signals regardless of the type of facial mask employed.

While the present embodiments are described with respect to transforming voice signals impacted by facial masks of participants of an online meeting, it will be appreciated that voice signals impacted by any type of facial or other covering affecting the voice signals (e.g., mask, scarf, handkerchief, bandana, hand or other body portion, etc.) may be transformed for any scenarios or activities involving voice (e.g., telephone or other calls, communications, audio messages, speech and/or voice recognition systems, public address systems, voice responsive systems for performing actions, etc.). For example, present embodiments may be applied to transform voice signals for medical situations (e.g., where facial masks are typically used), such as surgical situations and other medical procedures using robots and machines that run on voice control (and video communication). Further, the impact or effect to voice signals from a facial mask or other covering may include modification of any characteristics of the voice signals (e.g., frequency attenuations or gains, intensity attenuations or gains, reduction in speech recognition, changes in phonemes and/or prosody, etc.).

Figure 1:
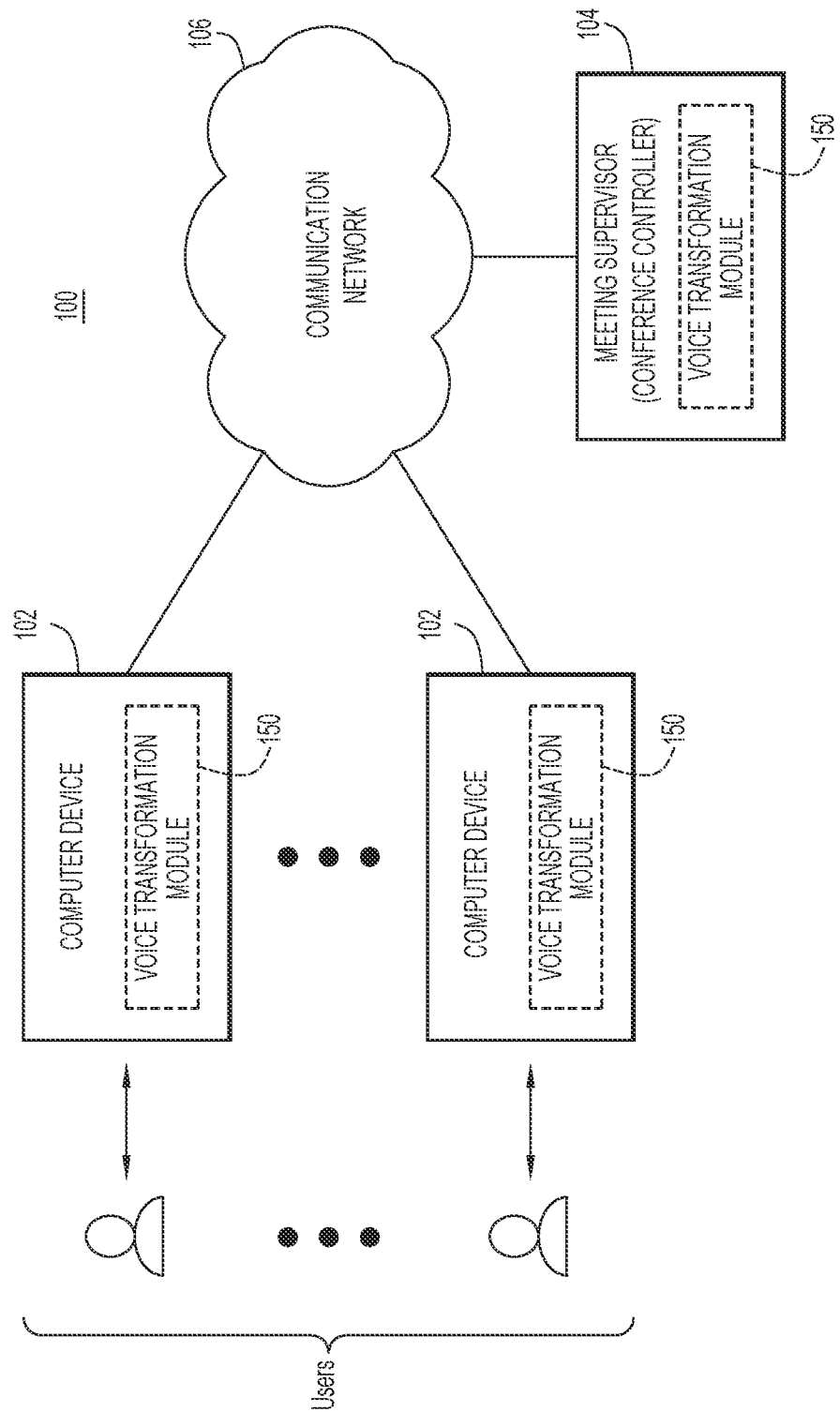
FIG. 1 is a block diagram of an example online meeting environment in which transformation of voice signals to compensate for effects of a facial mask may be implemented, according to an example embodiment.

FIG. 1 illustrates a block diagram of an example online meeting environment 100 in which an embodiment presented herein may be implemented. Environment 100 includes multiple computer devices 102 (collectively referred to as computer devices, participant devices, or platforms) operated by local users/participants, a meeting supervisor or server (also referred to as a "conference controller") 104 configured to support online (e.g., web-based or over-a-network) collaborative meetings between the computer devices, and a communication network 106 communicatively coupled to the computer devices and the meeting supervisor. Computer devices 102 can take on a variety of forms, including a smartphone, tablet, laptop computer, desktop computer, video conference endpoint, and the like.

Communication network 106 may include one or more wide area networks (WANs), such as the Internet, and one or more local area networks (LANs). Computer devices 102 may communicate with each other, and with meeting supervisor 104, over communication network 106 using a variety of known or hereafter developed communication protocols. For example, the computer devices 102 and meeting supervisor 104 may exchange Internet Protocol (IP) data packets, Realtime Transport Protocol (RTP) media packets (e.g., audio and video packets), and so on.

Computer devices 102 may each host an online meeting application used to establish/join online meetings and a voice transformation module 150. According to embodiments presented herein, voice transformation module 150 of the computer device transforms voice signals to compensate for effects of a facial mask of a user of a computer device 102 as described below. In an embodiment, meeting supervisor 104 or other server system coupled to communication network 106 may host voice transformation module 150 to transform voice signals to compensate for effects of a facial mask of a user of a computer device 102 in substantially the same manner described below. In this case, voice signals of a user of a computer device 102 impacted by a facial mask may be provided to voice transformation module 150 on meeting supervisor 104 for processing (e.g., as audio signals, etc.) and the resulting transformed voice signals are distributed to computer devices 102 for conveyance to meeting participants via corresponding audio speakers.

Figure 2:
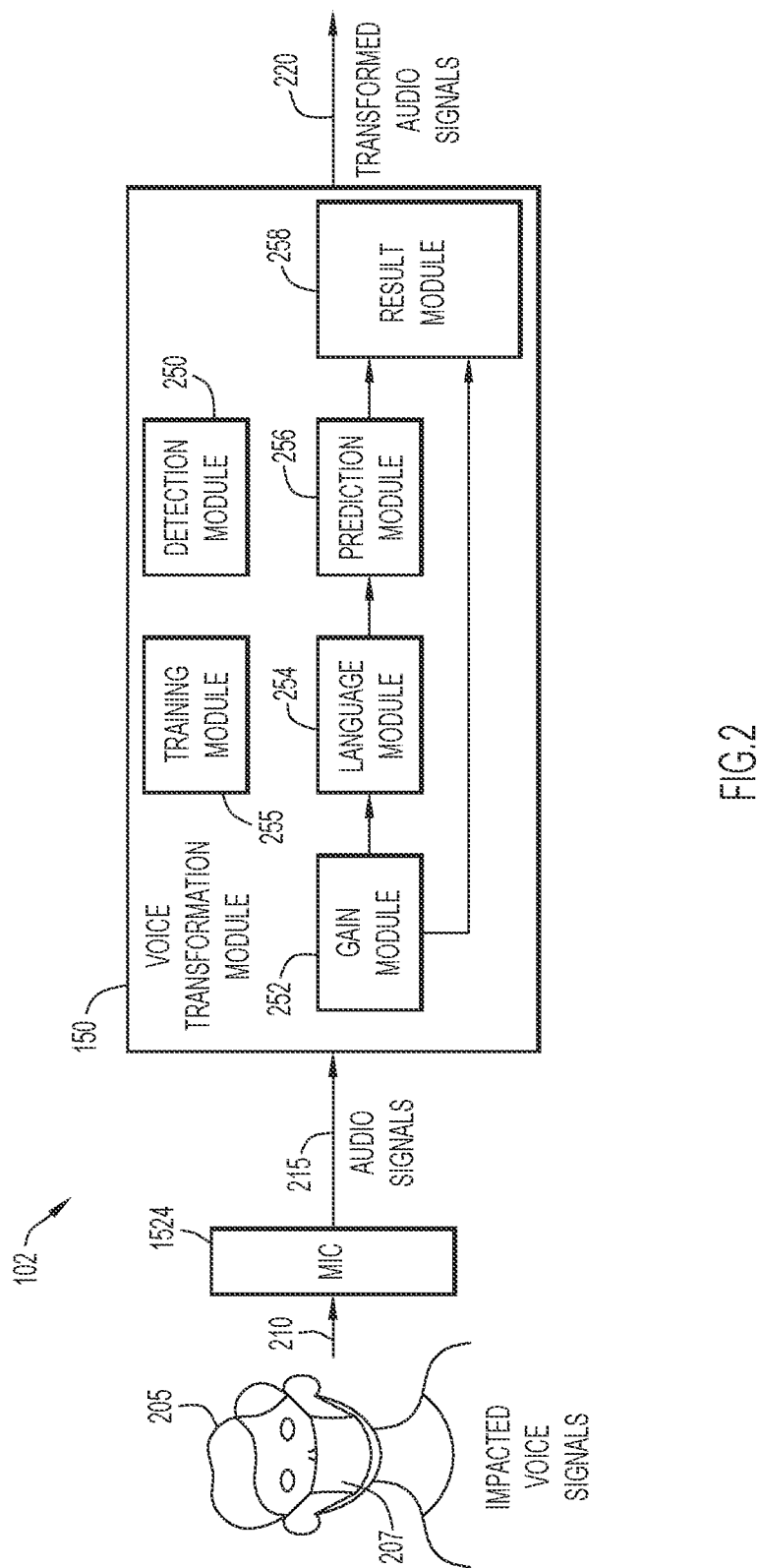
FIG. 2 illustrates a block diagram of a system configured for transforming voice signals to compensate for effects of a facial mask, according to an example embodiment.

FIG. 2 illustrates voice transformation module 150 implemented on a computer device 102 and configured for transforming voice signals of a user employing a facial mask to compensate for effects of the facial mask according to an example embodiment. While FIG. 2 is described with respect to transforming voice signals of a participant of an online meeting, it will be appreciated that voice signals impacted by any type of facial or other covering affecting the voice signals (e.g., mask, scarf, handkerchief, bandana, hand or other body portion, etc.) may be transformed for any scenarios or activities involving voice (e.g., telephone or other calls, communications, audio messages, speech and/or voice recognition systems, public address systems, voice responsive systems for performing actions, etc.). Further, the impact to voice signals from a facial mask or other covering may include modification of any characteristics of the voice signals (e.g., frequency attenuations or gains, intensity attenuations or gains, reduction in speech recognition, changes in phonemes and/or prosody, etc.).

Initially, computer device 102 enables a user 205 to join an online meeting. In an embodiment, computer device 102 includes a camera or other image capture device 1526 (FIG. 15) to capture images (e.g., still images, video, etc.) of the user and a surrounding environment, a microphone or other sound sensing device 1524 to capture voice signals of user 205 and produce audio signals representing the voice signals for processing by computer device 102, and a display or monitor 1530 to present meeting content to the user.

Voice transformation module 150 includes a detection module 250, a gain module 252, a language module 254, a training module 255, a prediction module 256, and a result module 258. Voice signals 210 from user 205 that are impacted by a facial mask 207 are captured by microphone 1524. The microphone produces audio signals 215 (corresponding to impacted voice signals 210) that are provided to voice transformation module 150 for processing. Camera 1526 captures visual information including images (e.g., still images, video, etc.) of user 205, and provides the captured visual information to detection module 250 (e.g., and to a meeting or other application, etc.). Detection module 250 analyzes the captured visual information to determine a presence of a facial mask on user 205 as described below.

Audio signals 215 are provided to gain module 252 for processing. The gain module employs a machine learning gain model to adjust a strength of signals (or gains) across different frequencies using a non-linear function that handles different types of facial masks and produces a same consistent audio output resembling original voice signals (e.g., unaffected by a facial mask). Language module 254 receives adjusted audio signals from the gain module, and produces a spectrogram in order to highlight audio characteristics of the adjusted audio signals. The language module employs a machine learning language classifier to determine a natural or spoken language of speech of the adjusted audio signals based on the spectrogram. The machine learning language classifier determines a probability for each of a set of natural or spoken languages that the speech from the adjusted audio signals belongs to that language, and indicates the language from the set with the highest probability.

Prediction module 256 decomposes the spectrogram into phonemes and prosody. Phonemes are units of sound that compose a word, while prosody are elements of larger units of speech, including intonation, stress and rhythm. Intonation generally refers to variation in pitch (e.g., attitudes and emotions, difference between statements and questions, important elements, controlling conversational interaction, etc.). Stress generally refers to emphasis provided to a certain syllable or word. Rhythm generally refers to a partitioning of time into equal portions with respect to a language (e.g., duration of syllables, time interval between stressed syllables, etc.). Prosody may be determined from combinations of metrics including fundamental frequency, duration, intensity or sound pressure level, and spectral characteristics (e.g., energy distribution, etc.).

Prediction module 256 employs a machine learning prediction model for each language of the set of languages. The machine learning prediction model corresponding to the language determined by language module 254 is used to predict and synthesize a next phoneme and prosody based on a previous sequence of data. The machine learning prediction model may also look slightly ahead to provide better insights for a word corresponding to the phoneme and prosody.

Result module 258 combines audio outputs from gain module 252 and prediction module 256 to produce transformed audio signals 220 for distribution to computer devices 102 of one or more other users of the online meeting. The transformed audio signals may be conveyed to the other users as transformed voice signals via corresponding audio speakers 1522. The transformed voice signals resemble original voice signals of user 205 without use of a facial mask (e.g., voice signals from user 205 unaffected by a facial mask, etc.).

Training module 255 generates training data for training one or more of the machine learning models of voice transformation module 150 as described below. The training data may be generated by a computer device 102 of a user, or by a different or separate computing device for use by computer device 102 of the user.

Figure 3:
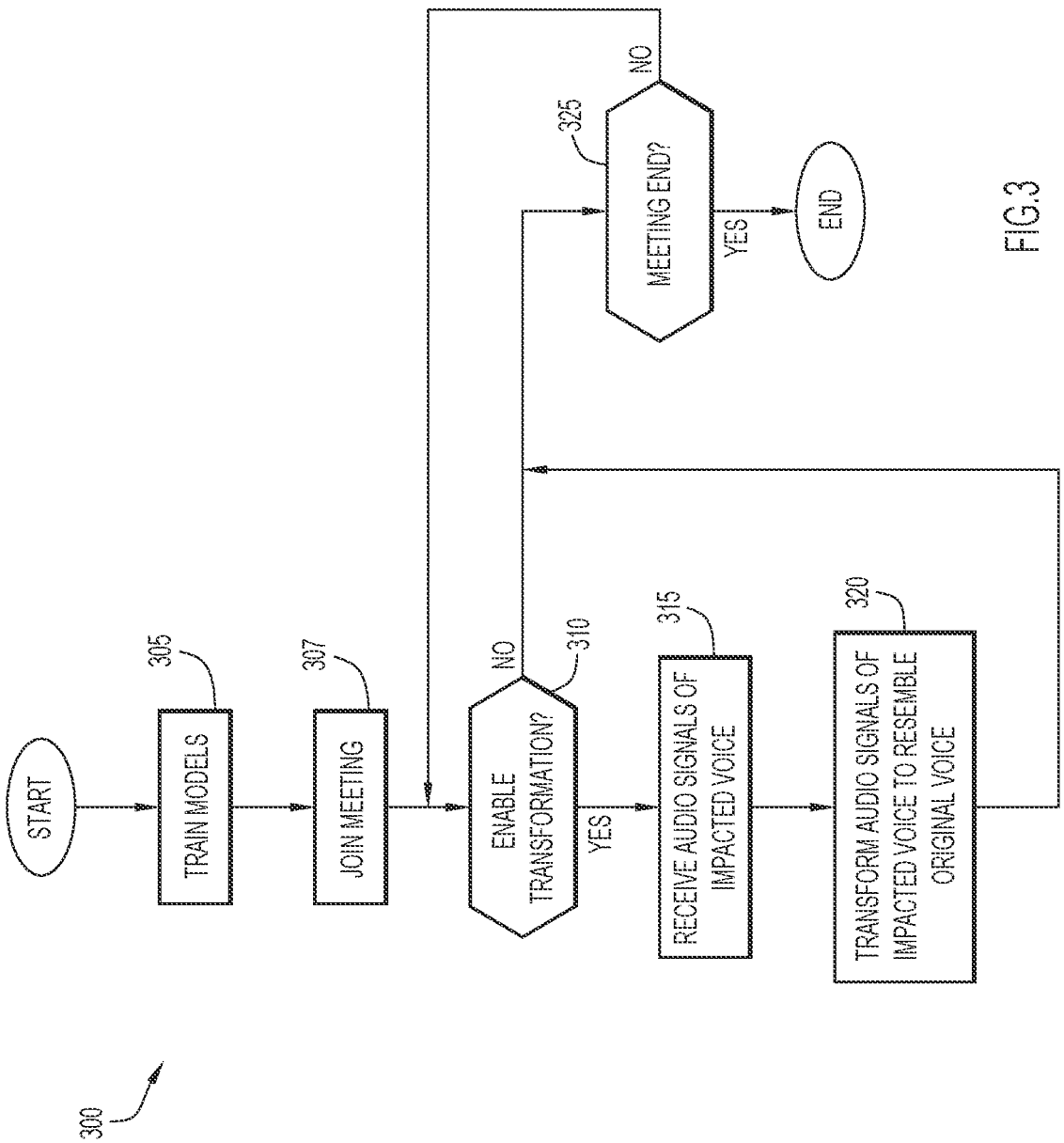
FIG. 3 is a flowchart of a method for processing voice signals to compensate for effects of a facial mask, according to an example embodiment.

With continued reference to FIGS. 1 and 2, FIG. 3 illustrates a flowchart of an example method 300 for processing voice signals to compensate for effects of a facial mask according to an example embodiment. While FIG. 3 is described with respect to transforming voice signals of a participant of an online meeting, it will be appreciated that voice signals impacted by any type of facial or other covering affecting the voice signals (e.g., mask, scarf, handkerchief, bandana, hand or other body portion, etc.) may be transformed for any scenarios or activities involving voice (e.g., telephone or other calls, communications, audio messages, speech and/or voice recognition systems, public address systems, voice responsive systems for performing actions, etc.).

Initially, the various machine learning models of gain module 252, language module 254, and prediction module 256 are trained at operation 305 as described below. This may accomplished by a computer device 102 of a corresponding user, or by another computer device. Computer device 102 of a user enables the user to join an online meeting at operation 307. Camera or other image capture device 1526 (FIG. 15) captures images (e.g., still images, video, etc.) of the user and a surrounding environment, and microphone or other sound sensing device 1524 captures voice signals of the user and produces audio signals (corresponding to the voice signals) that are provided to voice transformation module 150.

Voice transformation module 150 determines enablement status of voice signal transformation for the online meeting at operation 310. In an embodiment, the user may manually enable transformation of voice signals to compensate for effects of a facial mask. This may be accomplished in various manners (e.g., based on a configuration setting, response to a prompt, etc.).

In an embodiment, enablement of voice signal transformation may be based on detection of a facial mask employed by the user. This may be accomplished by detection module 250 employing a machine learning model (or computer vision) to detect a facial mask employed by the user and prompt the user for activation of the voice signal transformation. Detection module 250 may employ any conventional or other techniques for computer vision and/or machine learning (e.g., image processing, etc.). Detection module 250 may include any conventional or other machine learning models (e.g., mathematical/statistical, classifiers, feed-forward, recurrent, convolutional, deep learning, or other neural networks, etc.) to detect a facial mask employed by the user.

In an embodiment, detection module 250 may employ a neural network. For example, neural networks may include an input layer, one or more intermediate layers (e.g., including any hidden layers), and an output layer. Each layer includes one or more neurons, where the input layer neurons receive input (e.g., image/video information, feature vectors of image/video, etc.), and may be associated with weight values. The neurons of the intermediate and output layers are connected to one or more neurons of a preceding layer, and receive as input the output of a connected neuron of the preceding layer. Each connection is associated with a weight value, and each neuron produces an output based on a weighted combination of the inputs to that neuron. The output of a neuron may further be based on a bias value for certain types of neural networks (e.g., recurrent types of neural networks).

The weight (and bias) values may be adjusted based on various training techniques. For example, the machine learning of the neural network may be performed using a training set of images/video information as input and corresponding classifications as outputs, where the neural network attempts to produce the provided output (or classification) and uses an error from the output (e.g., difference between produced and known outputs) to adjust weight (and bias) values (e.g., via backpropagation or other training techniques).

In an embodiment, images/video of persons with and without facial masks may be used for the training set as input, while their known corresponding classifications (e.g., presence of a facial mask, absence of a facial mask, etc.) may be used for the training set as known output. In an embodiment, feature vectors may be extracted from the images/video and used for the training set as input, while their known corresponding classifications may be used for the training set as known output. A feature vector may include any suitable features of the images/video (e.g., person features/dimensions, pixel features, etc.). However, the training set may include any desired images/videos of any persons and/or facial masks or other coverings for the different classes to learn the characteristics (e.g., presence of a facial mask, absence of a facial mask, etc.) for detecting a user employing a facial mask.

The output layer of the neural network indicates a classification (e.g., presence of a facial mask, absence of a facial mask, etc.) for input data. By way of example, the classes used for the classification may include a class associated with the presence of a facial mask and a class associated with the absence of a facial mask. The output layer neurons may provide a classification (or specify a particular class)

that indicates a presence of a facial mask or absence of a facial mask within input data. Further, output layer neurons may be associated with the different classes indicating the presence of a facial mask or absence of a facial mask, and indicate a probability for the input data being within a corresponding class (e.g., a probability of the input data being in a class associated with a presence of a facial mask, a probability of the input data being in a class associated with an absence of a facial mask, etc.). The class associated with the highest probability is preferably selected as the class for the input data. In other words, when the class indicating presence of a facial mask is associated with the highest probability, a facial mask is considered to be present in the input data (e.g., captured images/video of the user, etc.). The captured image information of the user is provided to the neural network to determine the presence of a facial mask based on the resulting classification.

Figure 13:
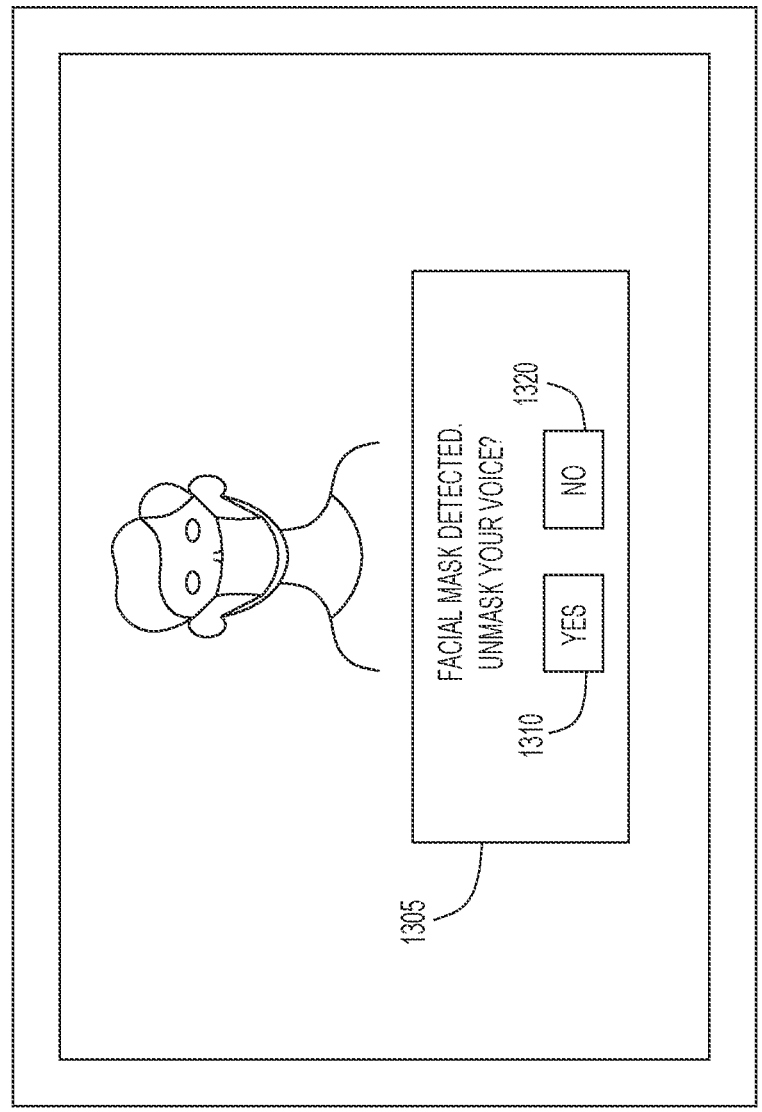
FIG. 13 illustrates an example user interface for prompting a user to enable transformation of voice signals to compensate for effects of a facial mask, according to an example embodiment.

When a facial mask is detected, detection module 250 may prompt the user for enablement of the voice transformation. By way of example, FIG. 13 illustrates a user interface 1300 that may be provided in response to detection of a facial mask employed by the user. The user interface prompts the user for activation of the voice signal transformation, and includes a prompt or dialog box 1305, and actuators 1310, 1320. Prompt 1305 requests an indication from the user pertaining to activation of the voice signal transformation. The user may actuate actuator 1310 or 1320, where actuator 1310 enables the voice transformation and actuator 1320 disables the voice transformation.

Referring back to FIG. 3, when voice signal transformation is to be enabled as determined at operation 310, voice transformation module 150 receives audio signals from microphone 1524 of a computer device 102 pertaining to captured voice signals impacted by a user facial mask at operation 315. The facial mask may attenuate higher frequencies of voice signals, thereby resulting in voice signals sounding muffled. Further, the facial mask may significantly impact speech recognition. Voice transformation module 150 transforms the audio signals of voice impacted by the facial mask to compensate for the effects of the facial mask at operation 320. In other words, the voice transformation module produces transformed audio signals that resemble original voice signals of the user without use of the facial mask (e.g., voice signals unaffected by a facial mask, etc.). The voice transformation module may partition the audio signals into audio segments of any size for processing (e.g., each segment may correspond to a certain number of seconds of voice signals (e.g., one or more seconds, portions of a second, etc.), a particular phoneme or word, etc.). The transformed audio signals are distributed to computer devices 102 of other users for conveyance as transformed voice signals to meeting participants via corresponding audio speakers 1522.

When voice signal transformation is disabled as determined at operation 310, or the audio signals have been transformed at operation 320, the above process repeats from operation 310 until the meeting completes as determined at operation 325.

Figure 4:
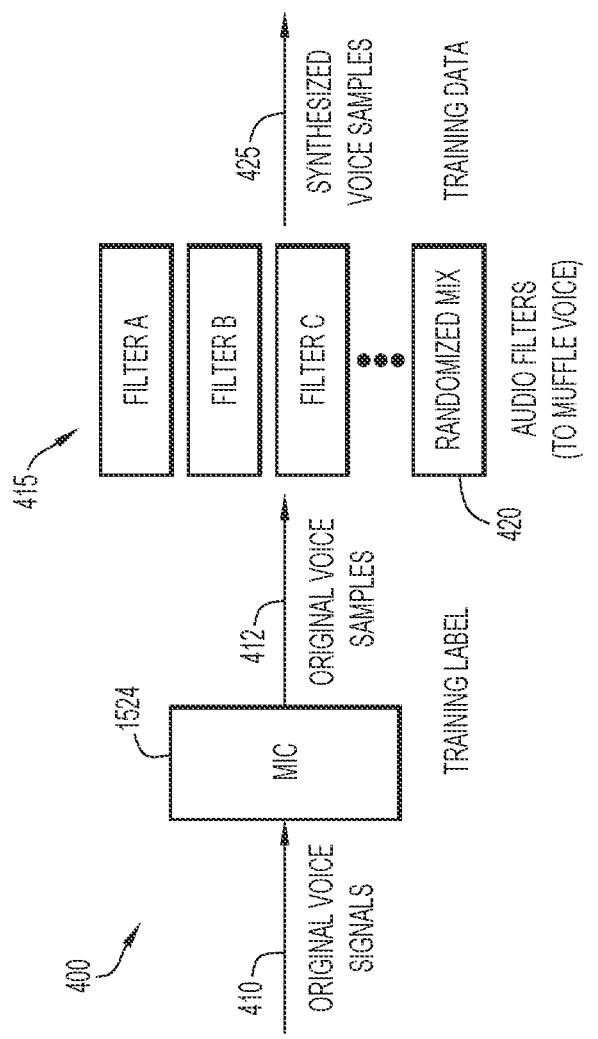
FIG. 4 is a flow diagram of a method for generating training data for training a machine learning gain model to adjust signal gain of voice signals, according to an example embodiment.

Voice transformation module 150 includes gain module 252 that employs a machine learning gain model to adjust the strength of signals (or gains) across different frequencies as described above. In order to train the machine learning gain model, training module 255 of voice verification module 150 generates a set of training data. With continued reference to FIGS. 1-3 and 13, FIG. 4 illustrates a flow diagram of an example method 400 for generating training data for the machine learning gain model to adjust signal gain of voice signals according to an example embodiment. While FIG. 4 is described with respect to transforming voice signals of a participant of an online meeting, it will be appreciated that voice signals impacted by any type of facial or other covering affecting the voice signals (e.g., mask, scarf, handkerchief, bandana, hand or other body portion, etc.) may be transformed for any scenarios or activities involving voice (e.g., telephone or other calls, communications, audio messages, speech and/or voice recognition systems, public address systems, voice responsive systems for performing actions, etc.).

Initially, original voice signals 410 from a user that does not employ a facial mask (e.g., the original voice signals are unaffected by a facial mask, etc.) are captured by microphone or other sound sensing device 1524 to generate original voice or audio samples 412 corresponding to the original voice signals. The original voice samples may correspond to any desired time or speech interval (e.g., each sample may correspond to a certain number of seconds of voice signals (e.g., one or more seconds, portions of a second, etc.), a particular phoneme or word, etc.).

Audio filters 415 are applied to each original voice sample to produce a collection of synthesized voice or audio samples 425 that simulate voice signals impacted by a facial mask for training the machine learning gain model. Audio filters 415 generally create muffled and blurry effects to simulate voice signals impacted by a facial mask. Since the muffled effect is a result of high frequency loss, audio filters 415 of an embodiment may include a variety of low-pass filters corresponding to different frequency ranges in order to simulate the varying effects of different types of facial masks. When a shield visor is employed in addition to a facial mask, speech may sound blurry due to internal reflections from the shield visor producing reverb or delay. In an embodiment, audio filters 415 may include a variety of comb filters to simulate this blurry effect.

Since different types of facial masks impact the original voice signals in different ways, a variety of audio filters 415 and a randomized mix of audio filters 420 are applied to the original voice samples to simulate effects of different facial masks. In an embodiment, a variety of audio filters 415 and the randomized mix of audio filters 420 may be applied to portions of the original voice samples (e.g., based on duration, sounds, etc.). In addition, each original voice sample is associated with a training label to correlate that original voice sample with a corresponding synthesized voice sample for training the machine learning gain model. The training label may indicate the types of effects (or filters) applied to the original voice sample. The original voice sample may serve as a known output for the corresponding synthesized voice sample used as input for training the machine learning gain model.

Figure 5:
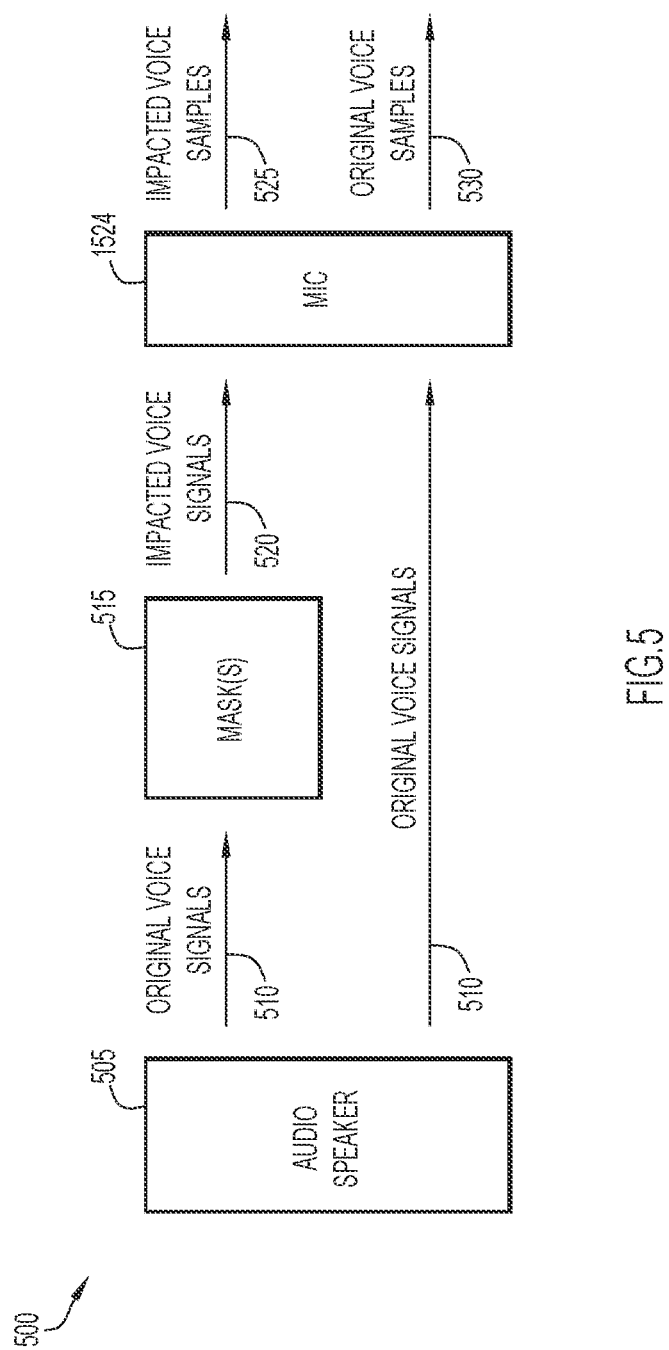
FIG. 5 is a flow diagram of an another method for generating training data for training the machine learning gain model to adjust signal gain of voice signals, according to an example embodiment.

Training module 255 of voice transformation module 150 may generate training data for the machine learning gain model to adjust signal gain of voice signals in other manners. With continued reference to FIGS. 1-4 and 13, FIG. 5 illustrates a flow diagram of an example method 500 for generating training data for the machine learning gain model to adjust signal gain of voice signals according to an example embodiment. While FIG. 5 is described with respect to transforming voice signals of a participant of an online meeting, it will be appreciated that voice signals impacted by any type of facial or other covering affecting the voice signals (e.g., mask, scarf, handkerchief, bandana, hand or other body portion, etc.) may be transformed for any scenarios or activities involving voice (e.g., telephone or other calls, communications, audio messages, speech and/or voice recognition systems, public address systems, voice responsive systems for performing actions, etc.).

Voice signals of a user without employing a facial mask may be played through an audio speaker 505 to produce original voice signals 510 (e.g., the original voice signals are unaffected by a facial mask, etc.). Audio speaker 505 may be of any type of speaker that conveys sound (e.g., loudspeaker, soundbar, computer speakers, portable speaker, etc.). The original voice signals may be pre-recorded, or captured by a microphone or other sound sensing device, and played through audio speaker 505. Microphone or other sound sensing device 1524 may capture original voice signals 510 from audio speaker 505 to generate corresponding original voice or audio samples 530 of the original voice signals. The original voice samples may correspond to any desired time or speech interval (e.g., each sample may correspond to a certain number of seconds of voice signals (e.g., one or more seconds, portions of a second, etc.), a particular phoneme or word, etc.).

Different types of facial masks 515 may be attached to (or disposed in proximity of) audio speaker 505 and applied to original voice signals 510 to produce impacted voice signals 520 that simulate voice signals of a user impacted by a facial mask. Microphone or other sound sensing device 1524 may capture impacted sound signals 510 to generate impacted voice or audio samples 525. The impacted voice samples may correspond to any desired time or speech interval (e.g., each sample may correspond to a certain number of seconds of voice signals (e.g., one or more seconds, portions of a second, etc.), a particular phoneme or word, etc.).

In addition, each original voice sample is associated with a training label to correlate that original voice sample with a corresponding impacted voice sample for training the machine learning gain model. The training label may indicate the types of effects (or facial masks) applied to the original voice sample. The original voice sample may serve as a known output for the corresponding impacted voice sample used as input for training the machine learning gain model. The original and impacted voice samples may be generated in any order (e.g., original voice signals provided without facial masks followed by original voice signals impacted by facial masks, original voice signals impacted by facial masks followed by original voice signals provided without facial masks, interleaving the original and impacted voice signals, etc.).

Figure 6:
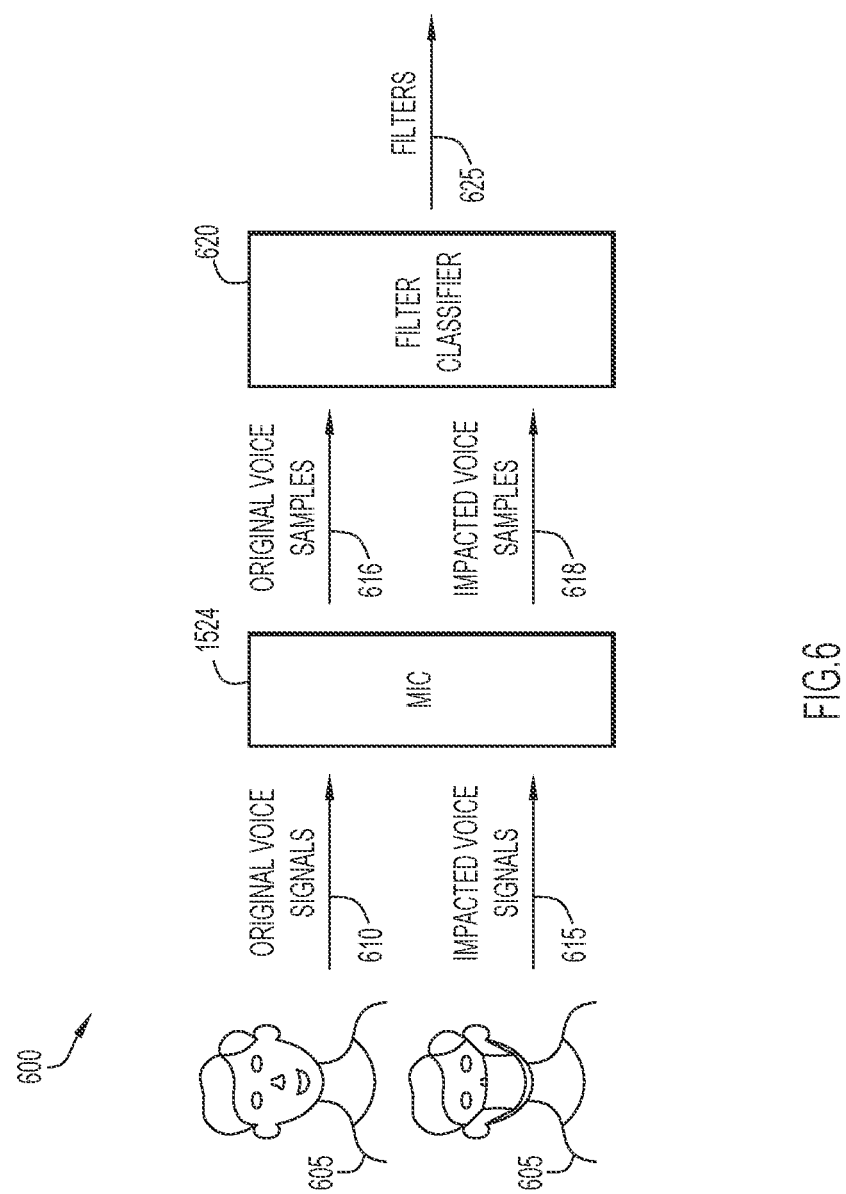
FIG. 6 is a flow diagram of a method for determining filters to use for generating training data for training the machine learning gain model to adjust signal gain of voice signals, according to an example embodiment.

Once the machine learning gain model is trained using the training data, training module 255 of voice verification module 150 may further tune the machine learning gain model to a specific user. With continued reference to FIGS. 1-5 and 13, FIG. 6 illustrates a flow diagram of an example method 600 for identifying audio filters for generating training data for tuning the machine learning gain model for a specific user according to an example embodiment. While FIG. 6 is described with respect to transforming voice signals of a participant of an online meeting, it will be appreciated that voice signals impacted by any type of facial or other covering affecting the voice signals (e.g., mask, scarf, handkerchief, bandana, hand or other body portion, etc.) may be transformed for any scenarios or activities involving voice (e.g., telephone or other calls, communications, audio messages, speech and/or voice recognition systems, public address systems, voice responsive systems for performing actions, etc.).

By way of example, a user 605 is prompted to recite certain phonetic pangrams that contain all forty sounds in the English language (and all the letters of the English alphabet). However, phrases or sentences containing any quantity of sounds of a language (and any quantity of letters or symbols of the language) may be utilized. The pangrams are recited with and without the user employing a facial mask, where the facial mask is preferably the same facial mask used for meetings or other activities. The user may employ any quantity of different facial masks to recite the pangrams in order to tune the machine learning gain model to those facial masks for a specific user. However, any quantity of facial masks and any quantity of pangrams of any natural or spoken language may be used to train the machine learning gain model for a specific user.

The recitation of the pangrams without a facial mask generates original voice signals 610, while the recitation of the pangrams with the facial mask generates impacted voice signals 615. Microphone or other sound sensing device 1524 captures original voice signals 610 to generate original voice or audio samples 616. Further, microphone or other sound sensing device 1524 captures impacted voice signals 615 to generate impacted voice or audio samples 618. The original and impacted voice samples may correspond to any desired time or speech interval (e.g., each sample may correspond to a certain number of seconds of voice signals (e.g., one or more seconds, portions of a second, etc.), a particular phoneme or word, etc.). The original and impacted voice samples may be generated in any order (e.g., original voice signals provided without facial masks followed by original voice signals impacted by facial masks, original voice signals impacted by facial masks followed by original voice signals provided without facial masks, interleaving the original and impacted voice signals, etc.).

Figure 14:
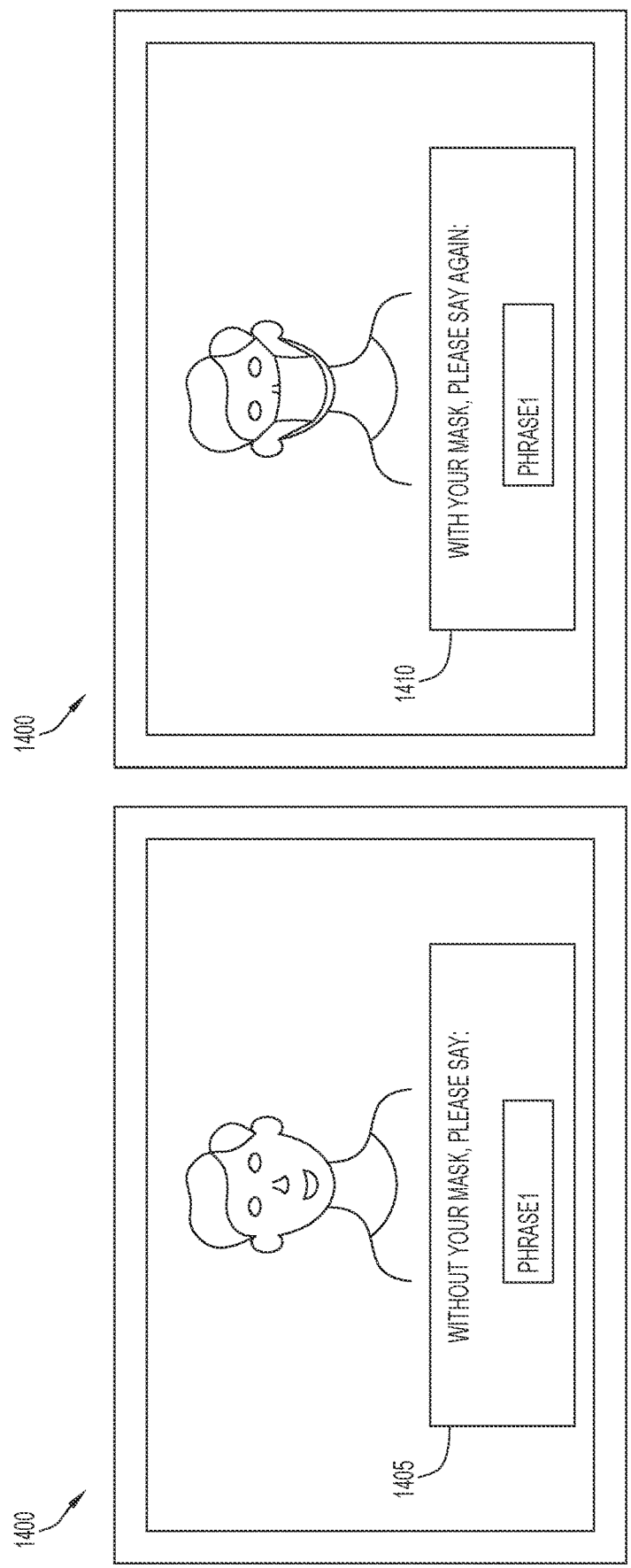
FIG. 14 illustrates an example user interface for prompting a user to recite a phrase for tuning a machine learning gain model to the user, according to an example embodiment.

By way of example, FIG. 14 illustrates a user interface 1400 that may be provided in order to tune the machine learning gain model to the specific user. The user interface prompts the user to recite a phrase or sentence, and presents a prompt 1405 and a prompt 1410. Prompt 1405 requests the user recite a phrase or sentence (e.g., PHRASE1 as shown in FIG. 14) without employing a facial mask, while prompt 1410 is subsequently presented to the user to recite the same phrase or sentence while employing a facial mask. Thus, voice signals of the same phrase with and without a facial mask are captured for generating additional training data for tuning. However, the phrase or sentence may be recited with and without the facial mask in any order (e.g., recitation with facial mask followed by recitation without a facial mask, recitation without a facial mask followed by recitation with a facial mask, etc.).

Since a user cannot recite the same phrase or sentence in exactly the same manner twice (e.g., same phonemes and/or prosody, etc.), original voice signals 610 (or original voice samples 616) cannot be used as ground truth directly. Thus, a pair of corresponding original and impacted voice samples cannot be used as the training set for the machine learning gain model. However, the pair of corresponding original and impacted voice samples may be provided to a filter classifier 620 (FIG. 6) specifically trained to select one or more audio filters 625 from audio filters 415 that most closely resemble effects from the user facial mask. The filter classifier is pre-trained on the same phonetic pangrams which are recited by other users. The use of a predetermined phonetic pangram increases classification accuracy.

Filter classifier 620 may be implemented by any conventional or other machine learning models (e.g., mathematical/statistical, classifiers, feed-forward, recurrent, convolutional, deep learning, or other neural networks, etc.). In an embodiment, the filter classifier may be implemented by a neural network substantially similar to the neural network described above. The machine learning for filter identification may use a training set of pairs of voice samples of users (e.g., pangrams recited with and without facial masks, etc.) as input and known classifications (e.g., filters or combinations of filters known to produce the effects between the pair of voice samples, etc.) as output, where the neural network attempts to produce the provided output (filter or filter combination). In an embodiment, the pairs of voice samples may be used for the training set as input, while the corresponding known classifications may be used for the training set as known output. In an embodiment, feature vectors may be extracted from the pairs of voice samples (e.g., audio characteristics (e.g., frequency at certain times), etc.) and used for the training set as input, while with the corresponding known classifications may be used for the training set as known output.

The output layer of the neural network indicates a classification (e.g., filter or filter combination, etc.) for input data. By way of example, the classes used for the classification may include a class associated with each filter or filter combination of a set. The output layer neurons may provide a classification (or specify a particular class) that indicates the filter or filter combination. Further, output layer neurons may be associated with the different classes indicating the filter or filter combination, and indicate a probability for the input data being within a corresponding class (e.g., a probability of the input data being in a class associated with a particular filter, a probability of the input data being in a class associated with a particular filter combination, etc.). The class associated with the highest probability is preferably selected as the class for the input data. In other words, when the class indicating a filter or filter combination is associated with the highest probability, the input is considered to correspond with that filter or filter combination. A pair of voice samples from a user reciting a phrase or sentence with and without employing a facial mask is provided to the neural network to identify the filter or filter combination.

Figure 7:
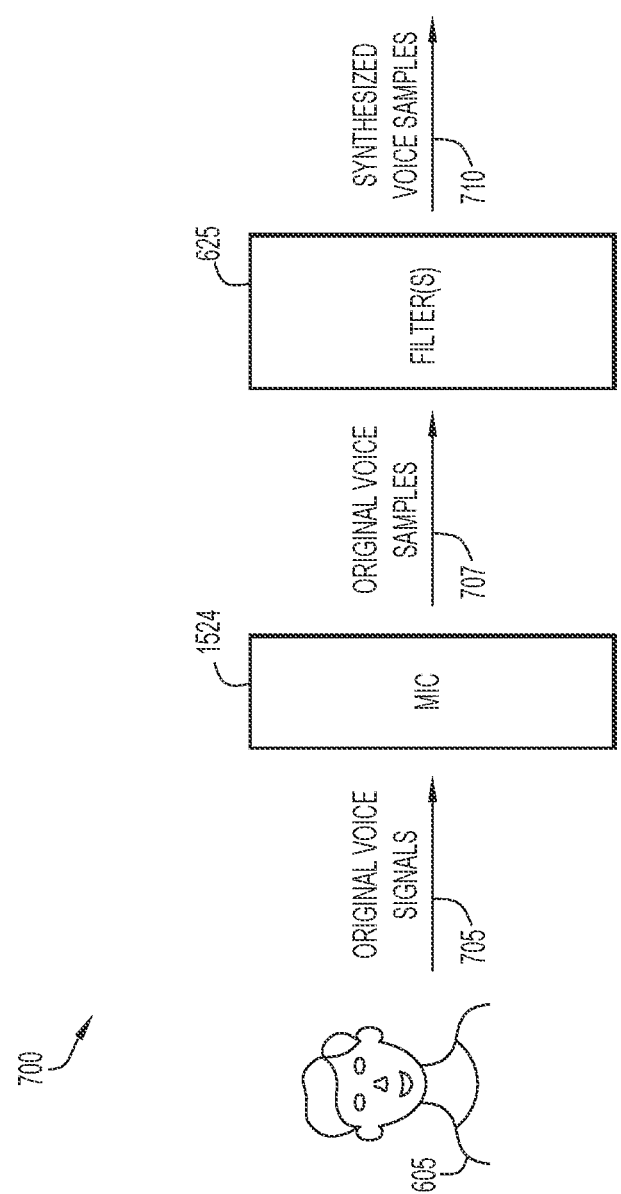
FIG. 7 is a flow diagram of a method for generating the training data for the machine learning gain model based on the determined filters of FIG. 6, according to an example embodiment.

Once filters 625 have been identified, training module 255 of voice transformation module 150 of an embodiment may generate more training data by applying filters 625 to voice signals of a user not employing a facial mask. With continued reference to FIGS. 1-6, 13, and 14, FIG. 7 illustrates a flow diagram of an example method 700 for using the identified filters from FIG. 6 for generating training data for tuning the machine learning gain model to a specific user according to an example embodiment. While FIG. 7 is described with respect to transforming voice signals of a participant of an online meeting, it will be appreciated that voice signals impacted by any type of facial or other covering affecting the voice signals (e.g., mask, scarf, handkerchief, bandana, hand or other body portion, etc.) may be transformed for any scenarios or activities involving voice (e.g., telephone or other calls, communications, audio messages, speech and/or voice recognition systems, public address systems, voice responsive systems for performing actions, etc.).

Initially, microphone or other sound sensing device 1524 captures original voice signals 705 of user 605 without a facial mask to generate original voice or audio samples 707. The original voice samples may correspond to any desired time or speech interval (e.g., each sample may correspond to a certain number of seconds of voice signals (e.g., one or more seconds, portions of a second, etc.), a particular phoneme or word, etc.). In an embodiment, original voice signals 705 may be obtained from recordings of the user without a facial mask during video conferences. In this case, the recording may be pre-partitioned to produce the original voice or audio samples.

The original voice samples are applied to filters 625 (determined by filter classifier 620) that produce effects similar to the user facial mask as described above. The filters produce synthesized voice or audio samples 710 that simulate voice signals of the user employing a facial mask (e.g., voice signals of the user affected by a facial mask, etc.). In addition, each original voice sample is associated with a training label to correlate that original voice sample with a corresponding synthesized voice sample for training the machine learning gain model. The training label may indicate the types of effects (or filters) applied to the original voice sample. The original voice sample may serve as a known output for the corresponding synthesized voice sample used as input for training the machine learning gain model for a specific user to adjust gain of voice signals. Thus, user tuning may be achieved by incrementally training the machine learning gain model.

Once a large amount of training data is obtained, one or more of the machine learning models of voice transformation module 150 (e.g., machine learning gain model, machine learning prediction model, etc.) may be trained to receive audio signals of voice from a user employing a facial mask as input and produce audio signals of clear voice as output. The training data includes the synthesized or impacted voice samples corresponding to a user employing a facial mask as input and the corresponding original voice samples as the known output or ground truth. The training labels of the original voice samples may be used to correlate those samples with the corresponding synthesized or impacted voice samples as described above.

Figure 8:
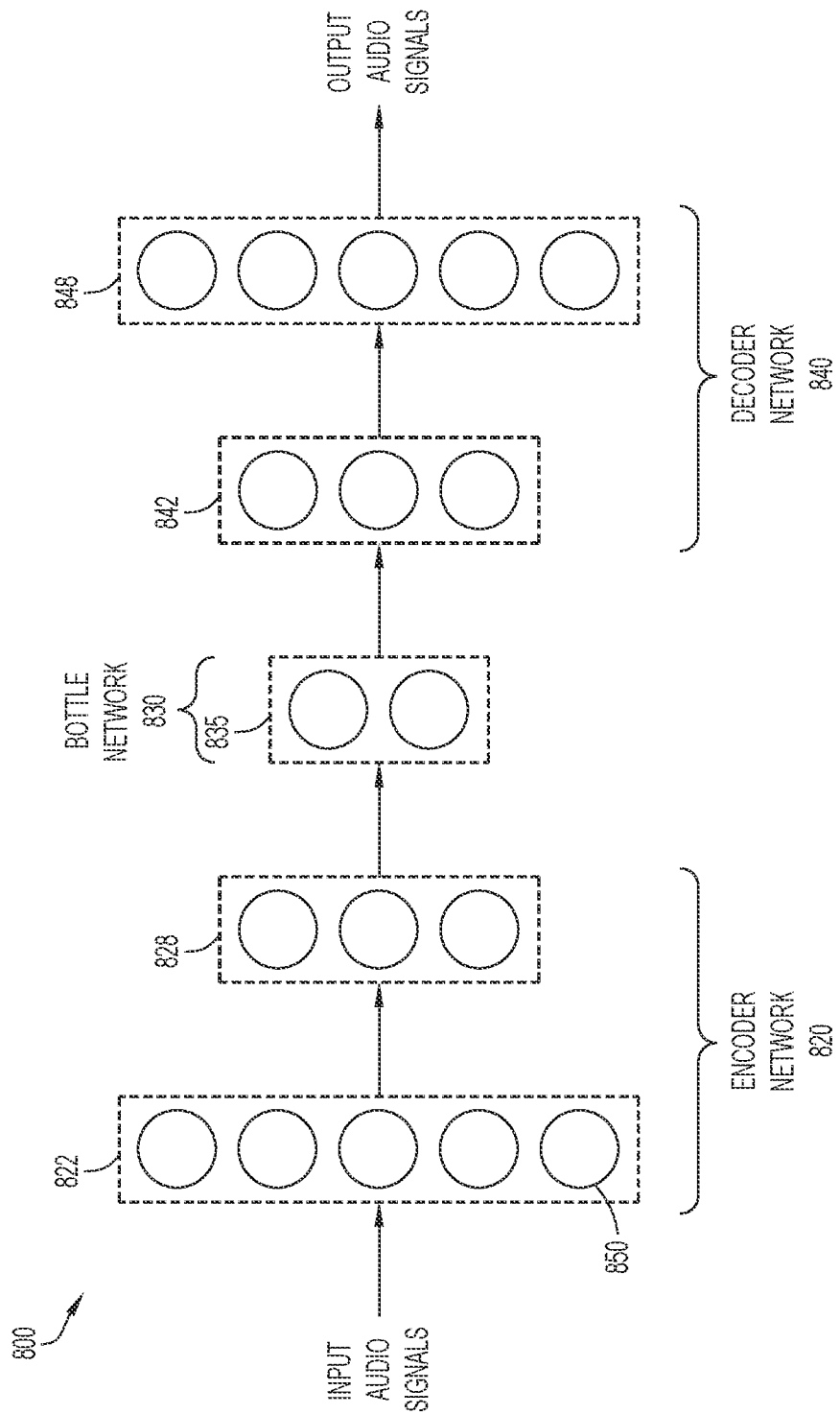
FIG. 8 is a diagram of a machine learning gain model for adjusting signal gain of voice signals, according to an example embodiment.

With continued reference to FIGS. 1-7, 13, and 14, FIG. 8 illustrates a machine learning gain model 800 to adjust signal gain of voice signals according to an example embodiment. While FIG. 8 is described with respect to transforming voice signals of a participant of an online meeting, it will be appreciated that voice signals impacted by any type of facial or other covering affecting the voice signals (e.g., mask, scarf, handkerchief, bandana, hand or other body portion, etc.) may be transformed for any scenarios or activities involving voice (e.g., telephone or other calls, communications, audio messages, speech and/or voice recognition systems, public address systems, voice responsive systems for performing actions, etc.).

Machine learning model 800 of gain module 252 adjusts a strength (or gain) of signals across different frequencies using a non-linear function that handles different types of facial masks and produces the same consistent audio output that resembles original voice signals of the user without employing the facial mask (e.g., voice signals unaffected by a facial mask, etc.). Machine learning gain model 800 mitigates (or reduces at least a portion of) the impact or effects of the facial mask. Machine learning model 800 may be implemented by any conventional or other machine learning models (e.g., mathematical/statistical, classifiers, feed-forward, recurrent, convolutional, deep learning, or other neural networks, etc.).

In an embodiment, machine learning model 800 may be an autoencoder type neural network that adjusts the strength (or gain) of voice signals across different frequencies using a non-linear function. For example, the autoencoder type neural network may include an input layer, one or more intermediate layers (e.g., including any hidden layers), and an output layer. Each layer includes one or more neurons, where the input layer neurons receive input (e.g., audio, feature vectors of audio, etc.), and may be associated with weight values. The neurons of the intermediate and output layers are connected to one or more neurons of a preceding layer, and receive as input the output of a connected neuron of the preceding layer. Each connection is associated with a weight value, and each neuron produces an output based on a weighted combination of the inputs to that neuron. The output of a neuron may further be based on a bias value for certain types of neural networks (e.g., recurrent types of neural networks).

The weight (and bias) values may be adjusted based on various training techniques. For example, the machine learning of the autoencoder type neural network may be performed using a training set generated in substantially the same manners described above. The training set may include the synthesized and/or impacted voice samples from a user as input and corresponding original voice signal samples from the user as output, where the autoencoder type neural network attempts to produce the provided output (e.g., original voice samples from the user) and uses an error from the output (e.g., difference between produced and known outputs) to adjust weight (and bias) values (e.g., via backpropagation or other training techniques).

In an embodiment, an architecture of the autoencoder type neural network of machine learning gain model 800 includes an encoder network 820, a bottle network 830, and a decoder network 840. Encoder network 820 includes an input layer 822 and one or more hidden layers 828, while bottle network 830 includes one or more hidden layers 835. Decoder network 840 includes one or more hidden layers 842 and an output layer 848. Each of these layers may include one or more neurons 850. Preferably, input layer 822 and output layer 848 include the same quantity of neurons, hidden layers 828 and 842 include a quantity of neurons less than the quantity of neurons of the input and output layers, and hidden layers 835 include a quantity of neurons less than the quantity of neurons of hidden layers 828 and 842. However, these layers may include any quantity of neurons.

Encoder network 820 receives input audio signals (e.g., corresponding to voice signals affected by a facial mask, etc.) at input layer 822 and produces an encoding with lower dimensions at bottle network 830. Decoder network 840 attempts to recreate or reproduce the input audio signals from the encoding in the bottle network. The autoencoder type neural network of machine learning model 800 is trained by using the synthesized and/or impacted voice samples simulating a user employing a facial mask as input and original voice samples of the user without employing a facial mask as known output in substantially the same manner described above. Since bottle network 830 or encoding incudes lower dimensions, the training enables the encoding to identify correlated features between the voice signals with and without a facial mask (e.g., basically minimizing or excluding features pertaining to the effects of the facial mask, etc.). The resulting output audio signals are generated by decoder network 840 using these features of the encoding, and closely resemble original voice signals produced by a user without a facial mask. In other words, the decoder network generates the output audio signals based on the correlated features of the encoding, thereby basically minimizing or removing effects of the facial mask. The output audio signals represent a modified version of the input audio signals with gains adjusted across different frequencies. The machine learning gain model operates with respect to characteristics of the audio (as opposed to characteristics of speech), and is independent of a language spoken by the user.

In an embodiment, machine learning gain model 800 may be trained to produce settings or parameters indicating adjusted gains across frequencies (e.g., as opposed to producing the actual adjusted audio signals, etc.). In this case, gain module 252 may utilize these settings or parameters to produce the adjusted audio signals. In addition, machine learning gain model 800 may provide a probability or confidence of validity with respect to the output audio signals or settings or parameters.

Figure 9:
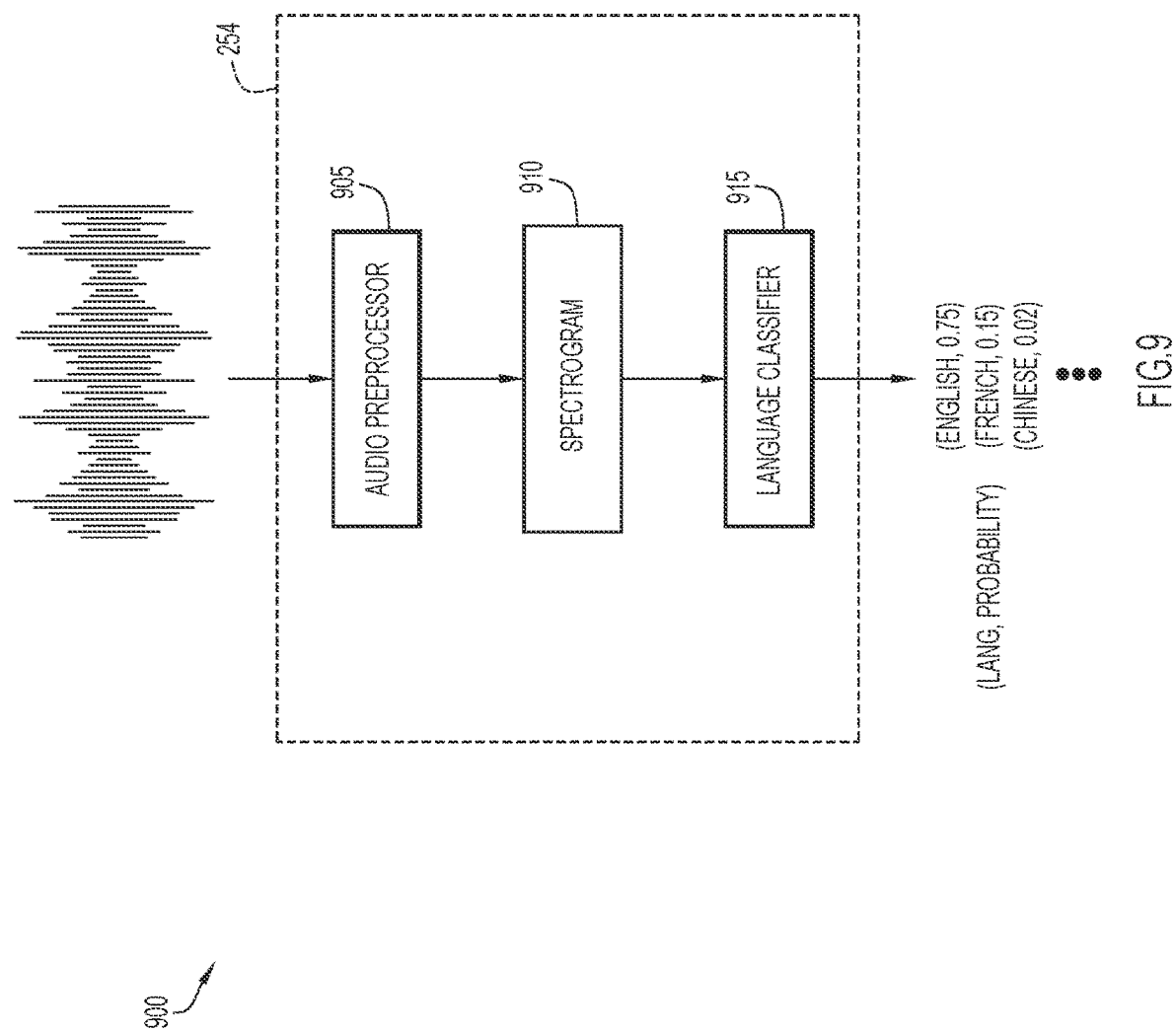
FIG. 9 is a flow diagram of a method for determining a natural or spoken language of voice signals, according to an example embodiment.

With continued reference to FIGS. 1-8, 13, and 14, FIG. 9 illustrates a method 900 for detecting a natural or spoken language from speech of voice signals according to an example embodiment. While FIG. 9 is described with respect to transforming voice signals of a participant of an online meeting, it will be appreciated that voice signals impacted by any type of facial or other covering affecting the voice signals (e.g., mask, scarf, handkerchief, bandana, hand or other body portion, etc.) may be transformed for any scenarios or activities involving voice (e.g., telephone or other calls, communications, audio messages, speech and/or voice recognition systems, public address systems, voice responsive systems for performing actions, etc.).

Initially, language module 254 includes an audio preprocessor 905 and a language classifier 915. Audio preprocessor 905 may be implemented by any conventional or other audio or signal processor, and converts the adjusted audio signals from gain module 252 to a spectrogram 910 in order to highlight audio characteristics. The spectrogram is basically a visual representation of frequencies of a signal over time (e.g., a graphical representation of a signal with frequency along a Y-axis and time over an X-axis (where intensity may be indicated by color-coding the graphical representation), etc.). The preprocessor may partition or receive the adjusted voice signals in audio segments of any size for processing to produce a corresponding spectrogram (e.g., each segment may correspond to a certain number of seconds of adjusted audio signals (e.g., one or more seconds, portions of a second, etc.), a particular phoneme or word, etc.)

Language classifier 915 receives spectrogram 910 as input, and determines for each of a set of natural or spoken languages a probability of speech of the spectrogram corresponding to that language. The language classifier outputs a language identification of the natural or spoken language with the highest probability (or confidence). The language classifier may be implemented by any conventional or other machine learning models (e.g., mathematical/statistical, classifiers, feed-forward, recurrent, convolutional, deep learning, or other neural networks, etc.).

In an embodiment, language classifier 915 includes a convolutional neural network (CNN) classifier similar to the neural network described above (e.g., for detection module 250, etc.). The machine learning for language detection may be performed using a training set of spectrograms of different words, phrases, or sentences as input and known classifications (e.g., known natural or spoken language) as output, where the neural network attempts to produce the provided output (or language indication). In an embodiment, the spectrograms of words, phrases, or sentences may be used for the training set as input, while the corresponding known classifications may be used for the training set as known output. In an embodiment, feature vectors may be extracted from the spectrograms of the words, phrases, or sentences (e.g., audio characteristics (e.g., frequency at certain times), n-grams from speech within the adjusted audio signals/spectrogram, etc.) and used for the training set as input, while the corresponding known classifications may be used for the training set as known output.

The output layer of the convolutional neural network (CNN) indicates a classification (e.g., natural or spoken language, etc.) for input data. By way of example, the classes used for the classification may include a class associated with each of a set of natural or spoken languages (e.g., English, French, Spanish, German, Italian, Chinese, Japanese, etc.). The output layer neurons may provide a classification (or specify a particular class) that indicates the detected language. Further, output layer neurons may be associated with the different classes indicating the language, and indicate a probability for the input data being within a corresponding class (e.g., a probability of the input data being in each class associated with a natural or spoken language, etc.). The class associated with the highest probability is preferably selected as the class for the input data. In other words, when the class indicating a language is associated with the highest probability, the input is considered to correspond with that language. Spectrogram 910 from audio preprocessor 905 is provided to the convolutional neural network (CNN) to determine natural or spoken languages and corresponding probabilities (or confidences) of the spectrogram corresponding to those languages (e.g., a probability of 0.75 for English, a probability of 0.15 for French, a probability of 0.02 for Chinese, etc. as shown in FIG. 9).

Prediction module 256 decomposes spectrogram 910 from language module 254 into phonemes and prosody. Phonemes are units of sound that compose a word, while prosody are elements of larger units of speech, including intonation, stress and rhythm. Intonation generally refers to variation in pitch (e.g., attitudes and emotions, difference between statements and questions, important elements, controlling conversational interaction, etc.). Stress generally refers to emphasis provided to a certain syllable or word. Rhythm generally refers to a partitioning of time into equal portions with respect to a language (e.g., duration of syllables, time interval between stressed syllables, etc.). Prosody may be determined from combinations of metrics within the spectrogram including fundamental frequency, duration, intensity or sound pressure level, and spectral characteristics (e.g., energy distribution, etc.). Prediction module 256 employs machine learning prediction models each specific to a corresponding natural or spoken language. The machine learning prediction model corresponding to the language determined by language module 254 is used to predict and synthesize a next phoneme and prosody.

Figure 10:
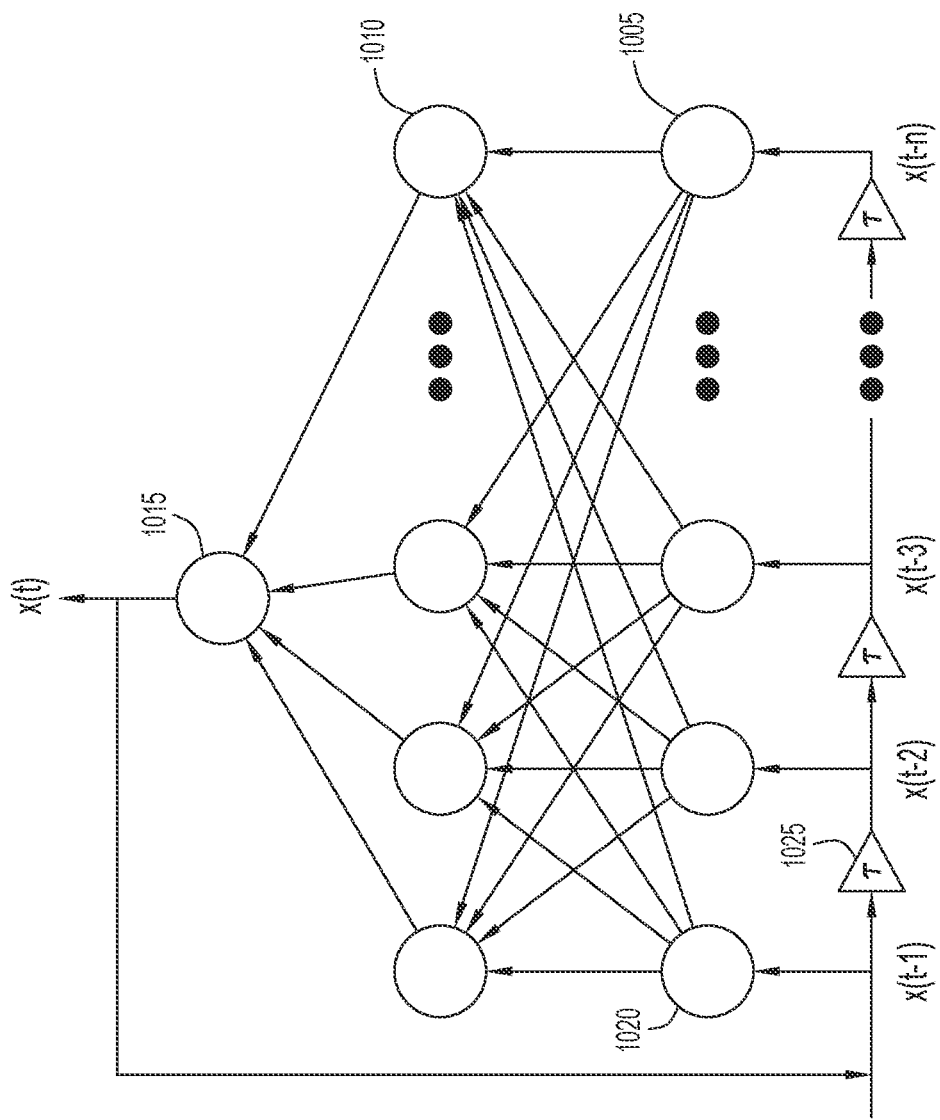
FIG. 10 is a diagram of a machine learning prediction model for predicting a phoneme and prosody of voice signals, according to an example embodiment.

With continued reference to FIGS. 1-9, 13, and 14, FIG. 10 illustrates a machine learning prediction model 1000 to predict and synthesize a next phoneme and prosody for a corresponding natural or spoken language according to an example embodiment. While FIG. 10 is described with respect to transforming voice signals of a participant of an online meeting, it will be appreciated that voice signals impacted by any type of facial or other covering affecting the voice signals (e.g., mask, scarf, handkerchief, bandana, hand or other body portion, etc.) may be transformed for any scenarios or activities involving voice (e.g., telephone or other calls, communications, audio messages, speech and/or voice recognition systems, public address systems, voice responsive systems for performing actions, etc.).

Machine learning model 1000 may be implemented by any conventional or other machine learning models (e.g., mathematical/statistical, classifiers, feed-forward, recurrent, convolutional, deep learning, or other neural networks, etc.). In an embodiment, machine learning prediction model 1000 may be an autoregressive type neural network that predicts and synthesizes a next phoneme and prosody based on a previous sequence of data. In addition, machine learning prediction model 1000 may use future data for better insights of a word that corresponds to the phoneme and prosody. For example, machine learning prediction model 1000 may include an input layer 1005, one or more intermediate layers 1010 (e.g., including any hidden layers), and an output layer 1015. Each layer includes one or more neurons 1020, where the input layer neurons receive input (e.g., audio, feature vectors of audio, etc.), and may be associated with weight values. The neurons of the intermediate and output layers are connected to one or more neurons of a preceding layer, and receive as input the output of a connected neuron of the preceding layer. Each connection is associated with a weight value, and each neuron produces an output based on a weighted combination of the inputs to that neuron.

Input layer 1005 initially receives audio data based on the spectrogram and produces an output or predicted phoneme and prosody (e.g., $x(t)$ as shown in FIG. 10). The input layer receives the output from the output layer (e.g., $x(t-1)$, $x(t-2)$, $x(t-3)$ through $x(t-n)$, where $x(t)$ represents a current output as viewed in FIG. 10) to produce a subsequent output. As further outputs are produced over time, the initial data is phased out in place of prior outputs and each neuron of the input layer receives data for an output produced at a different point in time. In other words, the output of the autoregressive type neural network is fed back to the input layer to create a previous sequence of data for prediction (e.g., the next output may eventually be based on only prior outputs, etc.). In an embodiment, the prior sequence of data may be generated by propagating a current output (e.g., $x(t)$, etc.) through a series of delay elements 1025 (to phase out the initial data over time). A delay element 1025 is disposed between corresponding pairs neurons of input layer 1005 to generate an output for a prior time corresponding to the number of delay elements traversed. For example, as shown in FIG. 10, $x(t-1)$ represents a current output fed back to the input layer, $x(t-2)$ represents output $x(t-1)$ traversing a delay element, $x(t-3)$ represents output $x(t-1)$ traversing two delay elements, etc.). The delay element may correspond to any time interval for a delay (e.g., microseconds, milliseconds, seconds, etc.).

The weight values may be adjusted based on various training techniques. The training preferably operates in a feed-forward mode (e.g., without feeding the output back to the input layer, etc.). For example, the machine learning of the autoregressive type neural network may be performed using a training set of audio signals of a certain natural or spoken language as input (e.g., a sequence of voice samples at corresponding times, etc.) and audio of known phoneme and prosody at those corresponding times as output, where the autoregressive type neural network attempts to produce the provided output (e.g., audio of phoneme and prosody at the time corresponding to the inputs) and uses an error from the output (e.g., difference between produced and known outputs) to adjust weight values (e.g., via backpropagation or other training techniques). Machine learning prediction model may be trained using synthesized or impacted voice samples and original voice samples generated in substantially the same manner described above. For example, the synthesized or impacted voice samples may be used for the training set as input, while audio of phoneme and prosody may be determined for the corresponding original voice sample and used as the known output.

Machine learning prediction model 1000 predicts and synthesizes audio of a next phoneme and prosody (e.g., $x(t)$ as shown in FIG. 10) based on a previous sequence of data (e.g., x(t−1), x(t−2), x(t−3) . . . x(t−n) as shown in FIG. 10). When some reasonable delay can be tolerated (e.g., approximately 100 milliseconds (ms), etc.), machine learning prediction model 1000 may also use future sequences of data (e.g., x(t+1), x(t+2) . . . x(t+m)) as input in order to have better insights of a word that corresponds to the phoneme and prosody. In other words, the delay enables the output to lag in time with respect to the voice signal, thereby enabling values (e.g., phoneme and prosody) for the adjusted audio signals subsequent in time to the lagged output (or effectively future values) to be provided to the input layer for consideration in determining the lagged output. The lagged output may be fed back to the input layer as described above. The future sequences may be obtained by buffering real-time voice data and processing the voice data corresponding to future times relative to the lagged output. In an embodiment, the future sequences may alternatively be obtained from off-line transcriptions of the voice signals (e.g., which contain an entire session of the voice signals including future times relative to a current output, etc.).

Machine learning prediction model 1000 is trained for a specific language, thereby being language-dependent. Thus, prediction module 256 includes a machine learning prediction model 1000 for each of a set of natural or spoken languages. In an embodiment, machine learning prediction model 1000 may be trained for any quantity of different natural or spoken languages. When language module 254 detects a natural or spoken language with a probability (or confidence) above a threshold, and the phoneme and prosody of the adjusted audio signals from gain module 252 are significantly different from the predicted phoneme and prosody from machine learning prediction model 1000 (e.g., a difference exceeds a threshold, etc.), result module 258 replaces the phoneme and prosody in the adjusted audio signals from the gain module with the audio of the predicted phoneme and prosody to produce resulting transformed audio signals from voice transformation module 150 resembling original voice signals without a facial mask.

For example, audio output from gain module 252 after adjusting gains across different frequencies may sound similar to "The departure time of your fly is 8 pm". Language module 254 confidently identifies the language as English. Accordingly, prediction module 256 may correct the audio output from gain module 252 by synthesizing for the audio output a consonant "t" after "fly" to produce resulting audio output sounding similar to "The departure time of your flight is 8 pm".

In an embodiment, each machine learning prediction model 1000 may further include, or be coupled to, a domain-specific vocabulary database to overcome certain speech ambiguities. For example, when a scenario pertains to the airline industry, the domain-specific vocabulary database may be populated with valid flight numbers. When speech of audio output from gain module 252 sounds similar to "My flight number is AA1" where a user intends "A81", machine learning prediction model 1000 determines that AA1 is not a valid flight number based on accessing the domain-specific vocabulary database, and corrects the speech in the audio output to "A81" based on the correct flight number from the domain-specific vocabulary database.

In an embodiment, machine learning prediction model 1000 may be trained to produce settings or parameters indicating predicted phoneme and prosody (e.g., as opposed to producing the actual audio signals, etc.). In this case, prediction module 256 may utilize these settings or parameters to produce the audio signals of the predicted phoneme and prosody. In addition, machine learning prediction model 1000 may provide a probability or confidence of validity with respect to the predicted phoneme and prosody or the settings or parameters.

Figure 11:
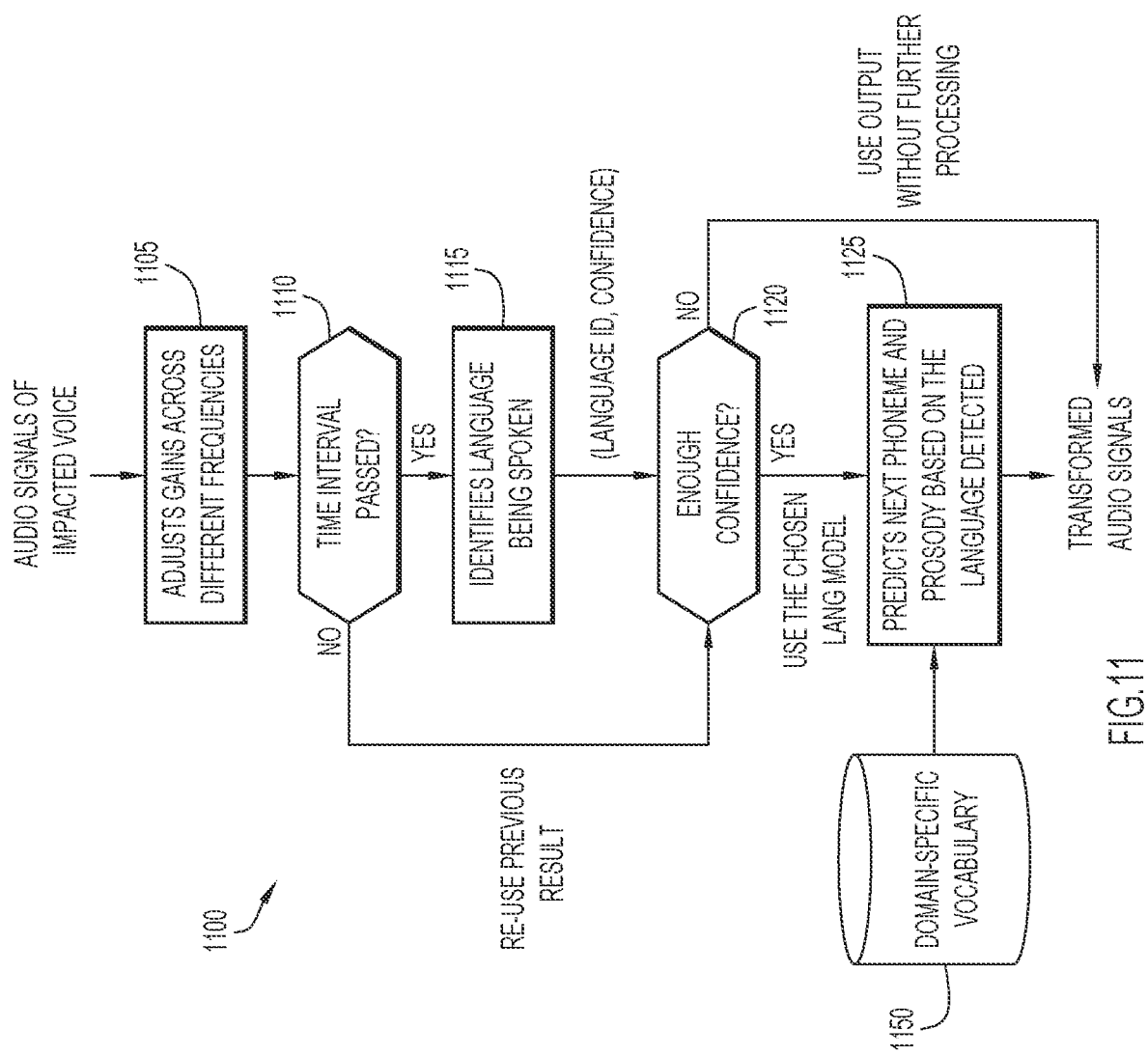
FIG. 11 is a flowchart of a method for transforming voice signals to compensate for effects of a facial mask, according to an example embodiment.

With continued reference to FIGS. 1-10, 13, and 14, FIG. 11 illustrates a flowchart of an example method 1100 for transforming voice signals to compensate for effects of a facial mask according to an example embodiment. While FIG. 11 is described with respect to transforming voice signals of a participant of an online meeting, it will be appreciated that voice signals impacted by any type of facial or other covering affecting the voice signals (e.g., mask, scarf, handkerchief, bandana, hand or other body portion, etc.) may be transformed for any scenarios or activities involving voice (e.g., telephone or other calls, communications, audio messages, speech and/or voice recognition systems, public address systems, voice responsive systems for performing actions, etc.).

Initially, a user employing a facial mask provides voice signals that have been impacted by the facial mask. Microphone or other sound sensing device 1524 of a computer device 102 captures the impacted voice signals to generate audio signals corresponding to the impacted voice signals. The audio signals are provided to voice transformation module 150 for processing. The voice transformation module may partition the audio signals into audio segments of any size for processing (e.g., each segment may correspond to a certain number of seconds of voice signals (e.g., one or more seconds, portions of a second, etc.), a particular phoneme or word, etc.).

Machine learning gain model 800 of gain module 252 adjusts gains across different frequencies to mitigate (or reduce at least a portion of) the impact or effects of the facial mask and produce adjusted audio signals at operation 1105 in substantially the same manner described above. Language module 254 periodically obtains the adjusted audio signals from gain module 252. This may be performed to periodically check for different spoken or natural languages and/or to enable a language to be detected with a higher confidence. The time interval for obtaining the adjusted audio signals may be set to any desired time interval (e.g., seconds, minutes, etc.).

When a sufficient time interval has passed for obtaining the adjusted audio signals as determined at operation 1110, language module 254 obtains the adjusted audio signals and determines the language being spoken and a corresponding probability or confidence for that language at operation 1115 in substantially the same manner described above. When the time interval has not expired, a previous result (e.g., previous detected language and corresponding probability (or confidence)) from language module 254 is utilized.

When the confidence or probability of the resulting language from language module 254 exceeds a confidence threshold as determined at operation 1120, prediction module 256 selects an appropriate machine learning prediction model 1000 based on the detected language to predict the next phoneme and prosody at operation 1125. The selected machine learning prediction model predicts the phoneme and prosody, where the adjusted audio signals may be enhanced in various manners. The confidence threshold may be any value, and is preferably any value in a range of 0.5 through 1.0.

In an embodiment, the selected machine learning prediction model enhances the adjusted audio signals from gain module 252 by examining speech of the adjusted audio signals and providing modifications for result module 258 to alter the adjusted audio signals with respect to phoneme and prosody in substantially the same manner described above.

In an embodiment, result module 258 may determine a difference between (or compare) the phoneme and prosody of the adjusted audio signals from gain module 252 and the audio of the predicted phoneme and prosody from machine learning prediction model 1000. In this case, when the difference exceeds a threshold (e.g., a feature vector distance, a percentage or number of differences, such as at least 20%, a difference or subtraction value, etc.), result module 258 replaces the phoneme and prosody in the adjusted audio signals from the gain module with the audio of the predicted phoneme and prosody to produce the resulting transformed audio signals.

In an embodiment, prediction module 256 may include, or be coupled, to a domain-specific vocabulary database 1150 to address domain-specific vocabulary and further minimize ambiguity in speech in substantially the same manner described above. In this case, the domain-specific vocabulary database may be accessed to determine valid information for the adjusted audio signals. The valid information may be inserted in the adjusted audio signals (e.g., along with the predicted phoneme and prosody) to produce the transformed audio signals.

For example, speech of audio output from gain module 252 may indicate a flight number (e.g., "AA1"). Machine learning prediction model 1000 may verify the flight number against the domain-specific vocabulary database, and determine that the flight number (AA1) is invalid. The machine learning prediction model may access the domain-specific vocabulary database to identify a valid flight number ("A81") based on similarity to the speech (e.g., quantity of overlapping elements, phonetics, etc.). The machine learning prediction model corrects the flight number in the speech of the audio output (to A81) based on the information from the domain-specific vocabulary database.

Result module 258 provides the modified audio signals as the resulting transformed audio signals that resemble original voice signals of the user without employing a facial mask. The transformed audio signals may be distributed and conveyed to other users of a meeting via corresponding audio speakers 1522 of computer devices 102.

When language module 254 cannot confidently identify the language being spoken as determined at operation 1120, result module 258 provides the adjusted audio signals from gain module 252 as the transformed audio signals. By way of example, an audio segment may be classified by language classifier 915 as corresponding to English with a probability of 0.6. This lower confidence may be caused by various factors (e.g., a user accent, etc.) that may impact the effectiveness of prediction module 256 that relies on language consistency. Without sufficient confidence from the language classifier, the prediction module is bypassed for that audio segment, and result module 258 uses the adjusted audio signals from gain module 252 as the resulting transformed audio signals. The transformed audio signals may be distributed and conveyed to other users of a meeting via corresponding audio speakers 1522 of computer devices 102.

In an embodiment, confidences or probabilities for audio outputs from machine learning gain model 800 and machine learning prediction model 1000 may be produced by the respective models and used by result module 258 to select one of those outputs for the resulting transformed audio signals for voice transformation module 150. For example, the output associated with the greater confidence or probability is selected for the resulting transformed audio signals. In an embodiment, the probabilities or confidences may be weighted based on various factors to select an output (e.g., a user accent may provide greater weight to the output from gain module 252 since phoneme and prosody prediction in this case is less reliable, etc.).

In an embodiment, the adjusted audio signals from gain module 252 may be combined with the audio of predicted phoneme and prosody of prediction module 256 by result module 258 to generate the transformed audio signals. The signals of these outputs may be combined using a weighted average to produce the resulting transformed voice signals. The weights may be based on the probabilities or confidences of the outputs.

In addition, result module 258 of an embodiment may employ a machine learning model to combine the adjusted audio signals from gain module 252 with the audio of the predicted phoneme and prosody of prediction module 256 to generate the transformed audio signals. The machine learning model may be implemented by any conventional or other machine learning models (e.g., mathematical/statistical, classifiers, feed-forward, recurrent, convolutional, deep learning, or other neural networks, etc.). In an embodiment, the machine learning model may be implemented by a neural network substantially similar to any of the neural networks described above (e.g., for detection module 250, machine learning gain module 800, etc.). The machine learning for the combination may use a training set of a voice sample, predicted phoneme and prosody, and respective confidences (for the voice sample and predicted phoneme and prosody) as input and known voice segments as output, where the neural network attempts to produce the provided output. The machine learning model uses an error from the output (e.g., difference between produced and known outputs) to adjust weight (and bias) values (e.g., via backpropagation or other training techniques).

In an embodiment, the voice samples, predicted phonemes and prosody, and respective confidences may be used for the training set as input, while corresponding known voice segments can be used for the training set as known output. In an embodiment, feature vectors may be extracted from the voice samples and predicted phonemes and prosody (e.g., audio characteristics (e.g., frequency at certain times), etc.) and used with the respective confidences for the training set as input, while the corresponding known voice segments may be used for the training set as known output. In addition, the training set for the machine learning model may include voice samples, predicted phoneme and prosody, and respective confidences for users with various speech characteristics (e.g., accents, etc.) to train the machine learning model for these speech characteristics. The output layer of the neural network produces the combined audio signals. The adjusted audio signals of gain module 252, predicted phoneme and prosody of prediction module 256, and the respective confidences are provided to the neural network of result module 258 to determine the combined audio signals serving as the transformed audio signals from voice transformation module 150. The transformed audio signals may be distributed and conveyed to other users of a meeting via corresponding audio speakers 1522 of computer devices 102.

Accordingly, an embodiment combines outputs from gain module 252 (e.g., adjusted gains) and prediction module 256 (e.g., predicted phoneme and prosody) to address (or correct) audio characteristics (e.g., gains across different frequencies, etc.) and speech characteristics (e.g., speech consistency based on phoneme and prosody, etc.) in order to produce significantly enhanced results.

Figure 12:
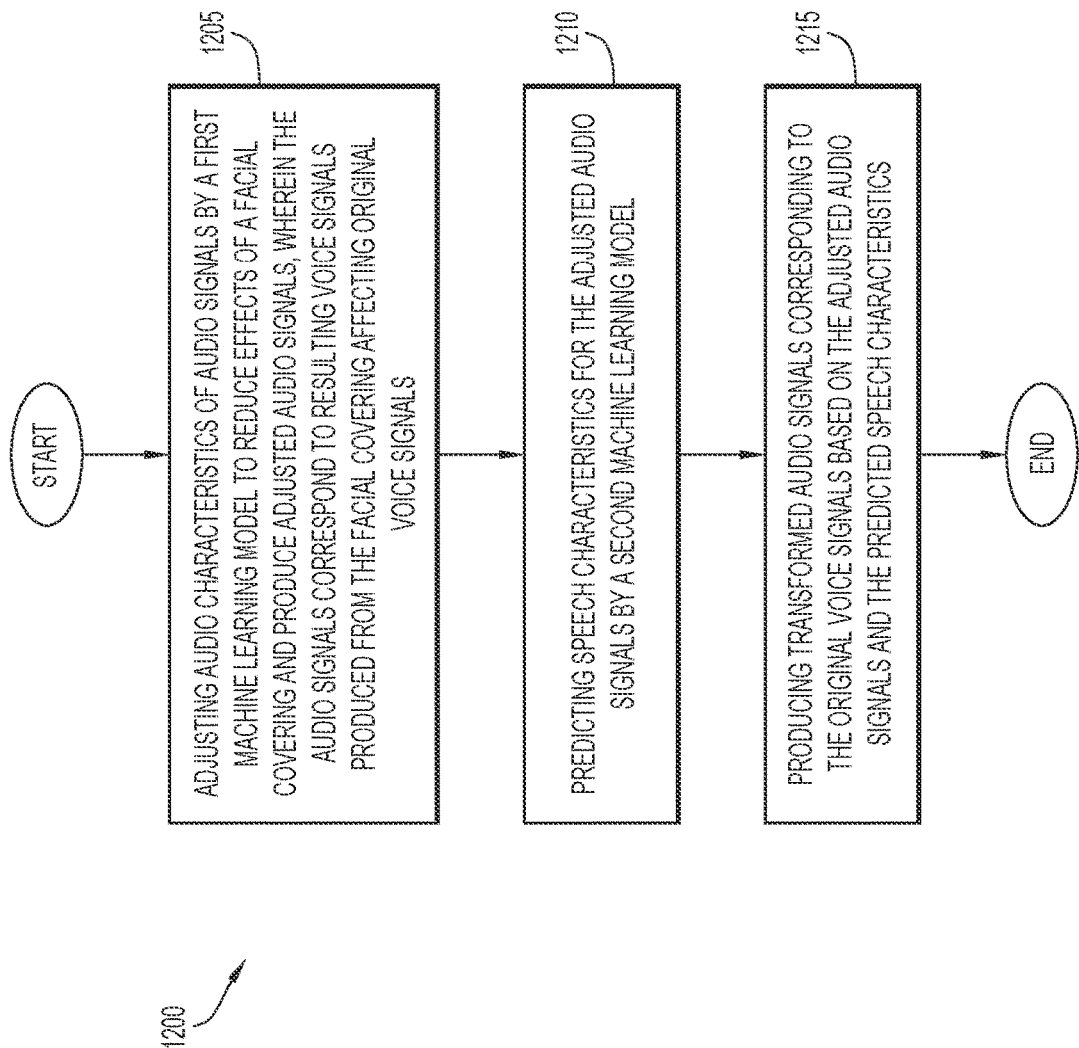
FIG. 12 illustrates a flowchart of a generalized method for transforming voice signals to compensate for effects of a facial covering, according to an example embodiment.

FIG. 12 is a flowchart of an example method 1200 for transforming voice signals to compensate for effects of a facial covering according to an example embodiment. At operation 1205, audio characteristics of audio signals are adjusted by a first machine learning model to reduce effects of a facial covering and produce adjusted audio signals. The audio signals correspond to resulting voice signals produced from the facial covering affecting original voice signals. At operation 1210, speech characteristics are predicted for the adjusted audio signals by a second machine learning model. At operation 1215, transformed audio signals corresponding to the original voice signals are produced based on the adjusted audio signals and the predicted speech characteristics.

Figure 15:
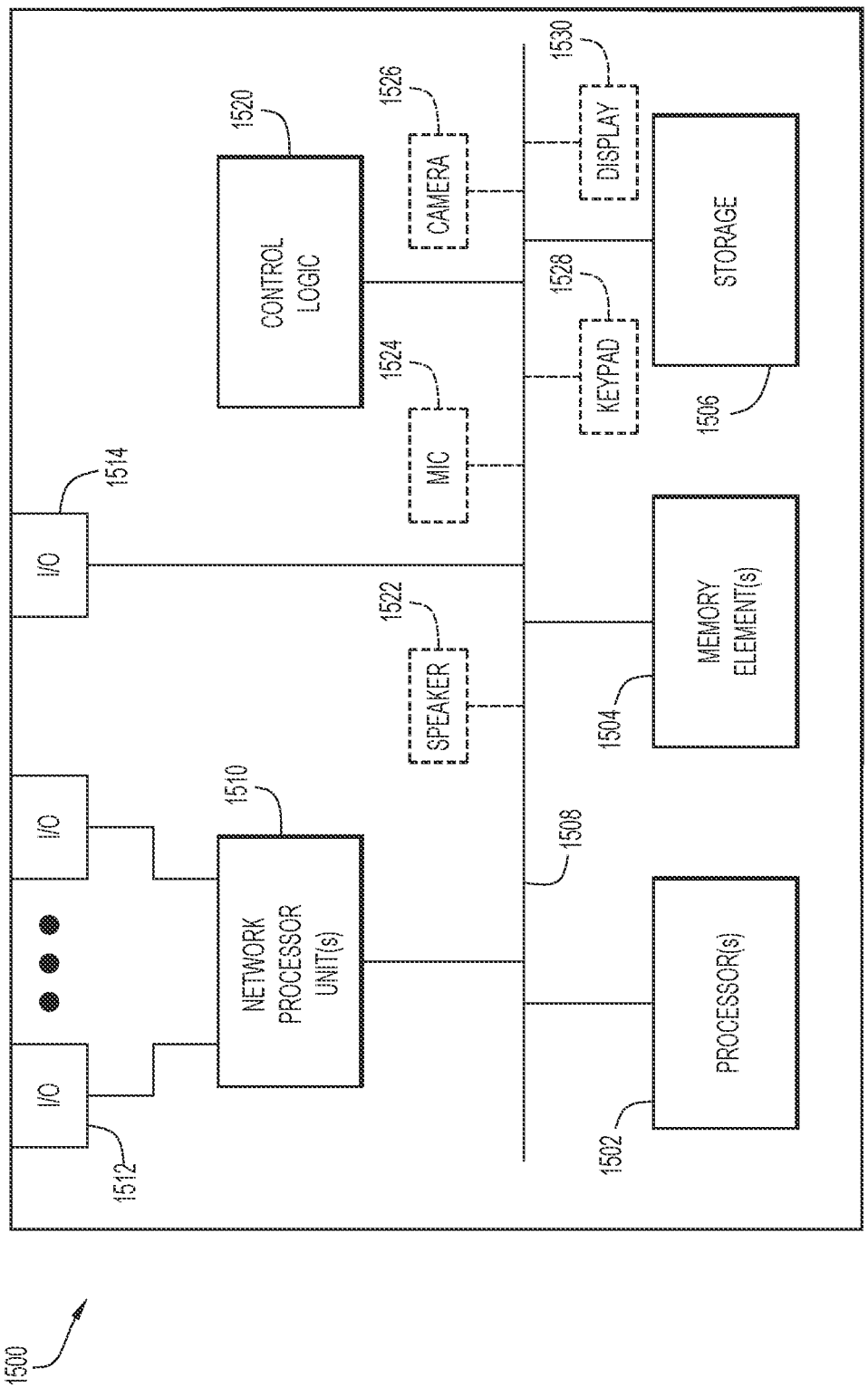
FIG. 15 illustrates a hardware block diagram of a computing device configured to perform functions associated with transforming voice signals to compensate for effects of a facial mask as discussed herein, according to an example embodiment.

Referring to FIG. 15, FIG. 15 illustrates a hardware block diagram of a computing device 1500 that may perform functions associated with operations discussed herein in connection with the techniques depicted in FIGS. 1-14. In various embodiments, a computing device or apparatus, such as computing device 1500 or any combination of computing devices 1500, may be configured as any device entity/entities (e.g., computer devices, meeting supervisor or other server systems, endpoint devices, etc.) as discussed for the techniques depicted in connection with FIGS. 1-14 in order to perform operations of the various techniques discussed herein.

In at least one embodiment, computing device 1500 may be any apparatus that may include one or more processor(s) 1502, one or more memory element(s) 1504, storage 1506, a bus 1508, one or more network processor unit(s) 1510 interconnected with one or more network input/output (I/O) interface(s) 1512, one or more I/O interface(s) 1514, and control logic 1520. In various embodiments, instructions associated with logic for computing device 1500 can overlap in any manner and are not limited to the specific allocation of instructions and/or operations described herein.

In at least one embodiment, processor(s) 1502 is/are at least one hardware processor configured to execute various tasks, operations and/or functions for computing device 1500 as described herein according to software and/or instructions configured for computing device 1500. Processor(s) 1502 (e.g., a hardware processor) can execute any type of instructions associated with data to achieve the operations detailed herein. In one example, processor(s) 1502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1504 and/or storage 1506 is/are configured to store data, information, software, and/or instructions associated with computing device 1500, and/or logic configured for memory element(s) 1504 and/or storage 1506. For example, any logic described herein (e.g., control logic 1520) can, in various embodiments, be stored for computing device 1500 using any combination of memory element(s) 1504 and/or storage 1506. Note that in some embodiments, storage 1506 can be consolidated with memory elements 1504 (or vice versa), or can overlap/exist in any other suitable manner.

In at least one embodiment, bus 1508 can be configured as an interface that enables one or more elements of computing device 1500 to communicate in order to exchange information and/or data. Bus 1508 can be implemented with any architecture designed for passing control, data and/or information between processors, memory elements/storage, peripheral devices, and/or any other hardware and/or software components that may be configured for computing device 1500. In at least one embodiment, bus 1508 may be implemented as a fast kernel-hosted interconnect, potentially using shared memory between processes (e.g., logic), which can enable efficient communication paths between the processes.

In various embodiments, network processor unit(s) 1510 may enable communication between computing device 1500 and other systems, entities, etc., via network I/O interface(s) 1512 to facilitate operations discussed for various embodiments described herein. In various embodiments, network processor unit(s) 1510 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 1500 and other systems, entities, etc. to facilitate operations for various embodiments described herein. In various embodiments, network I/O interface(s) 1512 can be configured as one or more Ethernet port(s), Fibre Channel ports, any other I/O port(s), and/or antenna(s)/antenna array(s) now known or hereafter developed. Thus, the network processor unit(s) 1510 and/or network I/O interfaces 1512 may include suitable interfaces for receiving, transmitting, and/or otherwise communicating data and/or information in a network environment.

I/O interface(s) 1514 allow for input and output of data and/or information with other entities that may be connected to computing device 1500. For example, I/O interface(s) 1514 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

With respect to certain entities (e.g., computer device, endpoint device, etc.), computing device 1500 may further include, or be coupled to, an audio speaker 1522 to convey sound, microphone or other sound sensing device 1524, camera or image capture device 1526, a keypad or keyboard 1528 to enter information (e.g., alphanumeric information, etc.), and/or a touch screen or other display 1530. These items may be coupled to bus 1508 or I/O interface(s) 1514 to transfer data with other elements of computing device 1500.

In various embodiments, control logic 1520 can include instructions that, when executed, cause processor(s) 1502 to perform operations, which can include, but not be limited to, providing overall control operations of computing device 1500; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

Present embodiments may provide various technical and other advantages. In an embodiment, audio characteristics (e.g., gains across frequencies, etc.) and speech characteristics (e.g., speech consistency pertaining to phonemes and prosody, etc.) of audio signals are corrected by machine learning models in order to compensate for the effects of a facial mask or other covering and produce transformed audio signals that provide significantly enhanced results (e.g., voice signals that closely resemble original voice signals without employing a facial mask, etc.).

In an embodiment, training data can be efficiently produced (through use of audio filters) that simulates various facial coverings to improve accuracy and training of machine learning models. In addition, the machine learning models may be tuned to a specific user by generating training data based on intelligent selection of audio filters by a machine learning model. This further enhances training and accuracy of the machine learning to produce transformed audio signals that provide significantly enhanced results (e.g., voice signals that closely resemble original voice signals without employing a facial mask, etc.).

The programs and software described herein may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other stores or repositories, queue, etc.). The data transmitted between device entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., graphical user interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, datacenters, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software. These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flowcharts and diagrams illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client, server, and other processing devices or systems, and/or any other intermediary processing devices. The software and/or algorithms described above and illustrated in the flowcharts and diagrams may be modified in any manner that accomplishes the functions described herein. In addition, the functions in the flowcharts, diagrams, or description may be performed in any order that accomplishes a desired operation.

The networks of present embodiments may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

In various embodiments, any device entity or apparatus as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more device entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory element(s) 1504 and/or storage 1506 can store data, software, code, instructions (e.g., processor instructions), logic, parameters, combinations thereof, and/or the like used for operations described herein. This includes memory elements 1504 and/or storage 1506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, any device entity or apparatus for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four device entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more device entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combinations of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In one form, a method is provided. The method comprises: adjusting audio characteristics of audio signals by a first machine learning model to reduce effects of a facial covering and produce adjusted audio signals, wherein the audio signals correspond to resulting voice signals produced from the facial covering affecting original voice signals; predicting speech characteristics for the adjusted audio signals by a second machine learning model; and producing transformed audio signals corresponding to the original voice signals based on the adjusted audio signals and predicted speech characteristics.

In one example, the audio characteristics include gains across frequencies, and the predicted speech characteristics include predicted phoneme and prosody.

In one example, the method further comprises determining a natural language of the adjusted audio signals and a corresponding confidence by a third machine learning model; wherein producing transformed audio signals comprises modifying the adjusted audio signals based on the predicted phoneme and prosody in response to the corresponding confidence satisfying a threshold.

In one example, modifying the adjusted audio signals comprises: determining a difference between a phoneme and prosody of the adjusted audio signals and the predicted phoneme and prosody; and replacing the phoneme and prosody of the adjusted audio signals with the predicted phoneme and prosody in response to the difference satisfying a threshold.

In one example, the method further comprises generating training data for training the first machine learning model by applying audio samples of voice signals to a set of audio filters to simulate effects of facial coverings, wherein the set of audio filters includes one or more types of audio filters from a group of low-pass filters and comb filters.

In one example, the method further comprises generating training data for training the first machine learning model by attaching different facial coverings to an audio speaker conveying voice signals.

In one example, the method further comprises: applying audio signals of predetermined speech by a user to a third machine learning model that identifies one or more audio filters to simulate effects of the facial covering; generating training data for training the first machine learning model by applying audio samples of voice signals of the user to the identified one or more audio filters; and training the first machine learning model with the generated training data to tune the first machine learning model to the user.

In one example, the method further comprises: detecting a user wearing the facial covering by a third machine learning model processing images of the user; and prompting the user for enabling generation of the transformed audio signals.

In one example, predicting the speech characteristics comprises accessing a domain-specific database for information to correct speech of the adjusted audio signals.

In one example, the facial covering includes a mask.

In another form, an apparatus is provided. The apparatus comprises: a computing system comprising one or more processors, wherein the one or more processors are configured to: adjust audio characteristics of audio signals by a first machine learning model to reduce effects of a facial covering and produce adjusted audio signals, wherein the audio signals correspond to resulting voice signals produced from the facial covering affecting original voice signals; predict speech characteristics for the adjusted audio signals by a second machine learning model; and produce transformed audio signals corresponding to the original voice signals based on the adjusted audio signals and predicted speech characteristics.

In another form, one or more non-transitory computer readable storage media are provided. The non-transitory computer readable storage media are encoded with processing instructions that, when executed by one or more processors, cause the one or more processors to: adjust audio characteristics of audio signals by a first machine learning model to reduce effects of a facial covering and produce adjusted audio signals, wherein the audio signals correspond to resulting voice signals produced from the facial covering affecting original voice signals; predict speech characteristics for the adjusted audio signals by a second machine learning model; and produce transformed audio signals corresponding to the original voice signals based on the adjusted audio signals and predicted speech characteristics.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising: adjusting audio characteristics of audio signals by a first machine learning model to reduce effects of a facial covering and produce adjusted audio signals, wherein the audio signals correspond to resulting voice signals produced from the facial covering affecting original voice signals and the first machine learning model determines a first confidence value for the adjusted audio signals;
predicting phoneme and prosody for the adjusted audio signals by a second machine learning model to produce predicted phoneme and prosody, wherein the second machine learning model determines a second confidence value for the predicted phoneme and prosody;
determining a natural language of the adjusted audio signals and a third confidence value by a third machine learning model; and
producing transformed audio signals corresponding to the original voice signals in response to the third confidence value satisfying a threshold by combining the adjusted audio signals with the predicted phoneme and prosody based on the first confidence value for the adjusted audio signals and the second confidence value for the predicted phoneme and prosody.

2. The method of claim 1, wherein the audio characteristics include gains across frequencies.

3. The method of claim 1, further comprising:
receiving the audio signals from an online meeting.

4. The method of claim 2, wherein combining the adjusted audio signals with the predicted phoneme and prosody comprises:
replacing the phoneme and prosody of the adjusted audio signals with the predicted phoneme and prosody in response to the second confidence value being greater than the first confidence value.

5. The method of claim 1, further comprising:
generating training data for training the first machine learning model by applying audio samples of voice signals to a set of audio filters to simulate effects of facial coverings, wherein the set of audio filters includes one or more types of audio filters from a group of low-pass filters and comb filters.

6. The method of claim 1, further comprising:
generating training data for training the first machine learning model by attaching different facial coverings to an audio speaker conveying voice signals.

7. The method of claim 1, further comprising: applying audio signals of predetermined speech by a user to a fourth machine learning model that identifies one or more audio filters to simulate effects of the facial covering;
generating training data for training the first machine learning model by applying audio samples of voice signals of the user to the one or more audio filters; and
training the first machine learning model with the training data to tune the first machine learning model to the user.

8. A method of claim 1, further comprising:
detecting a user wearing the facial covering by a fourth machine learning model processing images of the user; and prompting the user for enabling generation of the transformed audio signals.

9. The method of claim 1, wherein predicting the phoneme and prosody comprises:
accessing a domain-specific database for information to correct speech of the adjusted audio signals.

10. The method of claim 1, wherein the facial covering includes a mask.

11. An apparatus comprising: a computing system comprising one or more processors, wherein the one or more processors are configured to: adjust audio characteristics of audio signals by a first machine learning model to reduce effects of a facial covering and produce adjusted audio signals, wherein the audio signals correspond to resulting voice signals produced from the facial covering affecting original voice signals and the first machine learning model determines a first confidence value for the adjusted audio signals;
predict phoneme and prosody for the adjusted audio signals by a second machine learning model to produce predicted phoneme and prosody, wherein the second machine learning model determines a second confidence value for the predicted phoneme and prosody;
determine a natural language of the adjusted audio signals and a third confidence value by a third machine learning model; and
produce transformed audio signals corresponding to the original voice signals in response to the third confidence value satisfying a threshold by combining the adjusted audio signals with the predicted phoneme and prosody based on the first confidence value for the adjusted audio signals and the second confidence value for the predicted phoneme and prosody.

12. The apparatus of claim 11, wherein the audio characteristics include gains across frequencies.

13. The apparatus of claim 12, wherein the one or more processors are further configured to:
determine a natural language of the adjusted audio signals and a third confidence value by a third machine learning model;
wherein producing transformed audio signals comprises:
combining the adjusted audio signals with the predicted phoneme and prosody in response to the third confidence value satisfying a threshold, wherein combining the adjusted audio signals with the predicted phoneme and prosody comprises:
replacing the phoneme and prosody of the adjusted audio signals with the predicted phoneme and prosody in response to the second confidence value being greater than the first confidence value.

14. The apparatus of claim 11, wherein the one or more processors are further configured to: apply audio signals of predetermined speech by a user to a fourth machine learning model that identifies one or more audio filters to simulate effects of the facial covering;

generate training data for training the first machine learning model by applying audio samples of voice signals of the user to the one or more audio filters; and train the first machine learning model with the training data to tune the first machine learning model to the user.

15. The apparatus of claim 11, wherein predicting the phoneme and prosody comprises:

accessing a domain-specific database for information to correct speech of the adjusted audio signals.

16. One or more non-transitory computer readable storage media encoded with processing instructions that, when executed by one or more processors, cause the one or more processors to:

adjust audio characteristics of audio signals by a first machine learning model to reduce effects of a facial covering and produce adjusted audio signals, wherein the audio signals correspond to resulting voice signals produced from the facial covering affecting original voice signals and the first machine learning model determines a first confidence value for the adjusted audio signals;

predict phoneme and prosody for the adjusted audio signals by a second machine learning model to produce predicted phoneme and prosody, wherein the second machine learning model determines a second confidence value for the predicted phoneme and prosody;

determine a natural language of the adjusted audio signals and a third confidence value by a third machine learning model; and produce transformed audio signals corresponding to the original voice signals in response to the third confidence value satisfying a threshold by combining the adjusted audio signals with the predicted phoneme and prosody based on the first confidence value for the adjusted audio signals and the second confidence value for the predicted phoneme and prosody.

17. The one or more non-transitory computer readable storage media of claim 16, wherein the audio characteristics include gains across frequencies.

18. The one or more non-transitory computer readable storage media of claim 17, wherein the processing instructions further cause the one or more processors to:

determine a natural language of the adjusted audio signals and a third confidence value by a third machine learning model;

wherein producing transformed audio signals comprises:

combining the adjusted audio signals with the predicted phoneme and prosody in response to the third confidence value satisfying a threshold, wherein combining the adjusted audio signals with the predicted phoneme and prosody comprises:

replacing the phoneme and prosody of the adjusted audio signals with the predicted phoneme and prosody in response to the second confidence value being greater than the first confidence value.

19. The one or more non-transitory computer readable storage media of claim 16, wherein the processing instructions further cause the one or more processors to:

apply audio signals of predetermined speech by a user to a third fourth machine learning model that identifies one or more audio filters to simulate effects of the facial covering;

generate training data for training the first machine learning model by applying audio samples of voice signals of the user to the one or more audio filters; and train the first machine learning model with the training data to tune the first machine learning model to the user.

20. The one or more non-transitory computer readable storage media of claim 16, wherein predicting the phoneme and prosody comprises:

accessing a domain-specific database for information to correct speech of the adjusted audio signals.

* * * * *

UNITED STATES PATENT AND TRADEMARK OFFICE
CERTIFICATE OF CORRECTION

| | | |
|---|---|---|
| PATENT NO. | : 12,361,960 B2 | Page 1 of 1 |
| APPLICATION NO. | : 17/728334 | |
| DATED | : July 15, 2025 | |
| INVENTOR(S) | : Eric Y. Chen et al. | |

It is certified that error appears in the above-identified patent and that said Letters Patent is hereby corrected as shown below:

In the Claims

Claim 8, Column 30, Line 8, please replace "A method of" with --The method of--

Claim 13, Column 30, Lines 48-62, please replace the entire text to read --The apparatus of claim 12, wherein combining the adjusted audio signals with the predicted phoneme and prosody comprises: replacing the phoneme and prosody of the adjusted audio signals with the predicted phoneme and prosody in response to the second confidence value being greater than the first confidence value.--

Claim 14, Column 30, Line 64, please replace "process ors" with --processors--

Claim 18, Column 32, Lines 1-17, please replace the entire text to read --The one or more non-transitory computer readable storage media of claim 17, wherein combining the adjusted audio signals with the predicted phoneme and prosody comprises: replacing the phoneme and prosody of the adjusted audio signals with the predicted phoneme and prosody in response to the second confidence value being greater than the first confidence value.--

Claim 19, Column 32, Line 22, please replace "a third fourth machine" with --a fourth machine--

Signed and Sealed this
Second Day of September, 2025

Coke Morgan Stewart
*Acting Director of the United States Patent and Trademark Office*